(12) United States Patent
Dasalukunte et al.

(10) Patent No.: US 12,423,096 B2
(45) Date of Patent: Sep. 23, 2025

(54) METHODS AND DEVICES FOR SIGNAL PROCESSING

(71) Applicant: Intel Corporation, Santa Clara, CA (US)

(72) Inventors: Deepak Dasalukunte, Beaverton, OR (US); Richard Dorrance, Hillsboro, OR (US); Lu Lu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 17/560,298

(22) Filed: Dec. 23, 2021

(65) Prior Publication Data

US 2023/0205519 A1   Jun. 29, 2023

(51) Int. Cl.
*G06F 9/30* (2018.01)
*G06F 9/38* (2018.01)

(52) U.S. Cl.
CPC .......... *G06F 9/3001* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 2020/0285579 A1* | 9/2020 | Chen | G06F 12/0842 |
| 2020/0402198 A1* | 12/2020 | Ray | G06F 9/544 |
| 2020/0409700 A1* | 12/2020 | Sripada | G06F 9/3016 |
| 2021/0184795 A1* | 6/2021 | Ibars Casas | H03M 13/6561 |
| 2021/0200540 A1* | 7/2021 | Chofleming | G06F 15/80 |
| 2021/0390076 A1* | 12/2021 | Fang | G06F 13/1668 |

OTHER PUBLICATIONS

Fan, H et al., High-Performance FPGA-based Accelerator for Bayesian Neural networks, Nov. 2021,IEEE, pp. 1063-1068 (Year: 2021).*
Khan, O et al., Hardware Accelerator for Probabilistic Inference in 65-nm CMOS, 2016, IEEE pp. 837-845. (Year: 2016).*
Gelado, I. et al., An Asymmetric Distributed Shared Memory Model for Heterogeneous Parallel Systems, 2010, ACM, pp. 347-359. (Year: 2010).*
O. U. Khan et al., "Hardware Accelerator for Probabilistic Inference in 65-nm CMOS," in IEEE Transactions on VLSI Systems, Mar. 2016, vol. 24, Issue 3, pp. 837-845.

(Continued)

*Primary Examiner* — Eric Coleman
(74) *Attorney, Agent, or Firm* — Viering, Jentschura & Partner mbB

(57) ABSTRACT

A processor may include an interface configured to receive input data and instructions, and to provide processed data, a shared memory configured to store the received input data, an instruction memory configured to store the received instructions, a plurality of processing elements configured to perform a first set of arithmetic operations. The processor may further include a controller configured to control the plurality of processing elements and one or more accelerators based on the received instructions to obtain the processed data, by which the plurality of processing elements performs the first set of arithmetic operations and the one or more accelerators perform a second set of arithmetic operations based on the received input data stored in the shared memory.

25 Claims, 12 Drawing Sheets

(56) References Cited

OTHER PUBLICATIONS

H. T. Mora et al., "FPGA acceleration of Bayesian model-based analysis for time-independent problems", IEEE Global Conference on Signal and Information Processing (GlobalSIP), Montreal, QC, 2017, pp. 774-778.
G. Mingas, L. Bottolo, et al., "Particle MCMC algorithms and architectures for accelerating inference in state-space models". Int. J. Approx. Reasoning 83, 2017, pp. 413-433.
D. Dasalukunte et al., "A Vector Processor for Mean Field Bayesian Channel Estimation," in IEEE Transactions on Very Large-Scale Integration (VLSI) Systems, Jul. 2021, vol. 29, Issue 7, pp. 1348-1359.

* cited by examiner

METHODS AND DEVICES FOR SIGNAL PROCESSING

TECHNICAL FIELD

This disclosure generally relates to methods and devices for signal processing.

BACKGROUND

Communication techniques, in particular, radio communication techniques involve various types of signal processing operations to be performed, some depending on the corresponding communication technique, such as channel estimation, multiple input-multiple output (MIMO) detection, MIMO decoding, error correction, etc. In order to meet the time constraints to perform processing, communication devices may employ designated digital signal processing (DSP) processors or accelerators, that may perform the corresponding processing operations with respect to received communication signals.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
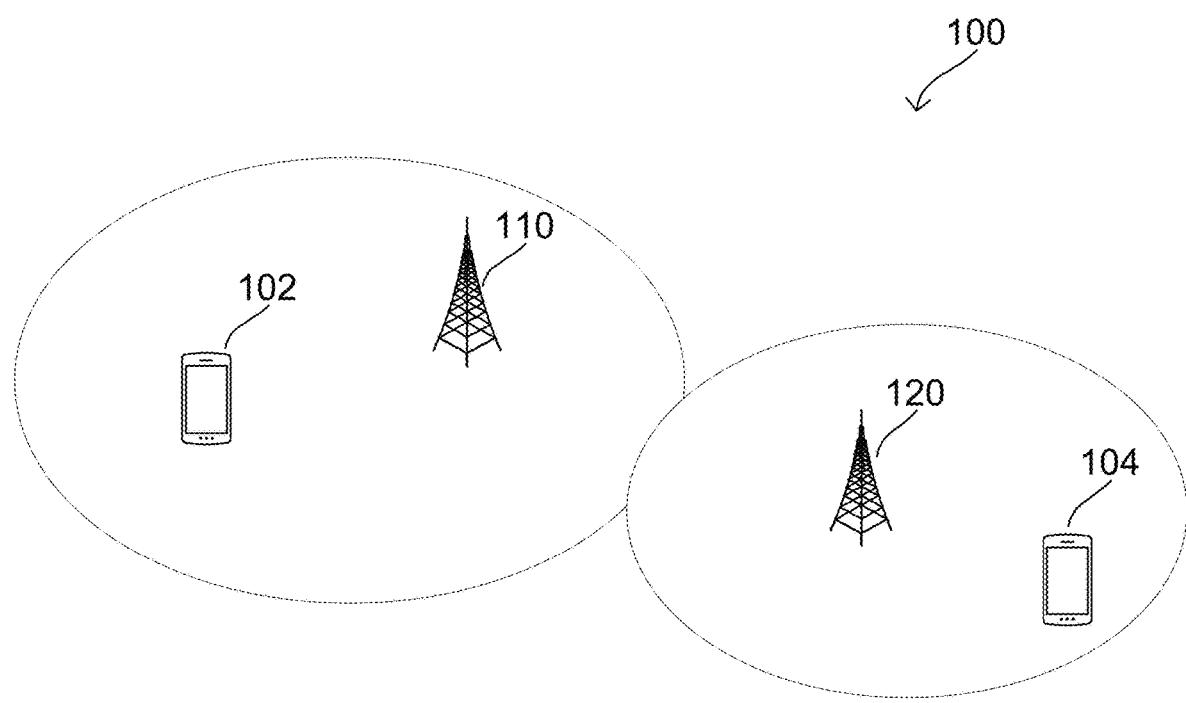
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

Figure 2:
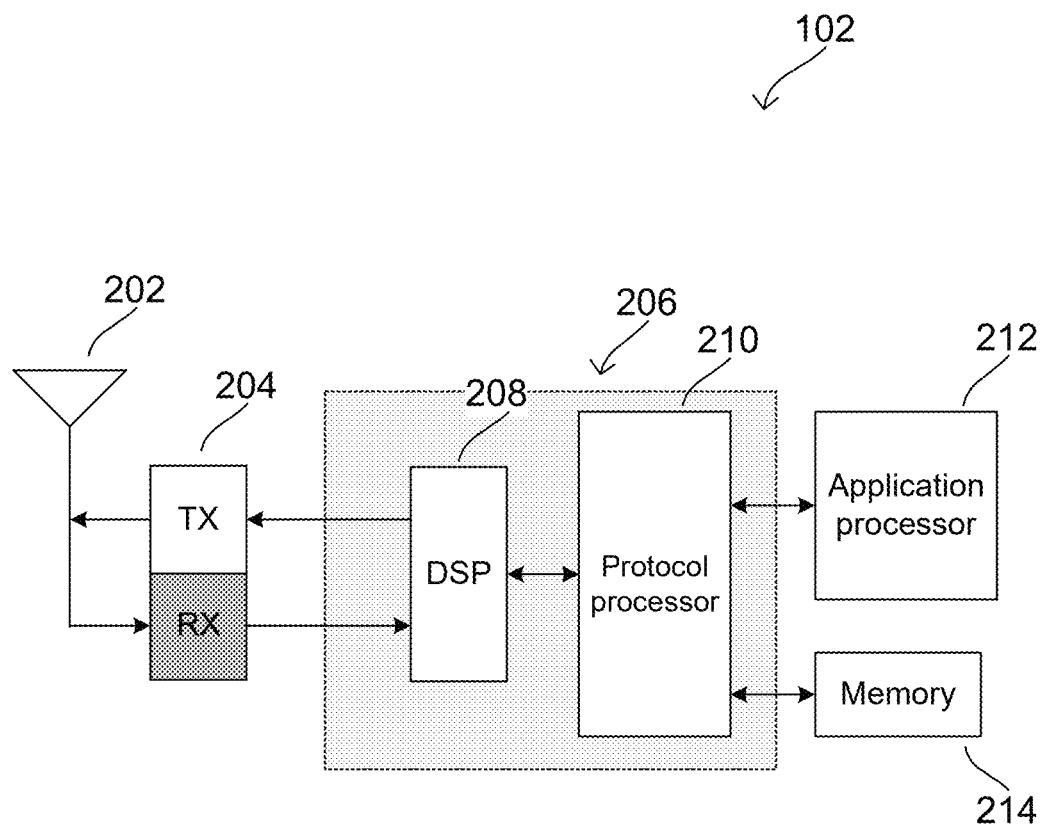
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs)), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions.

Digital signal processor 208 may further carry out various channel estimation processing. Digital signal processor 208 may have various processing functions based on received communication signals and perform estimations for communication channels according to a set of pilot observations with respect to the received communication signals. For example, digital signal processor 208 may perform channel estimations according to various techniques, such as Maximum Likelihood (MS) estimation, Least Squares (LS) estimation. Another example with respect to the channel estimations may be Bayesian estimation which is dependent on a priori statistical knowledge of the channel.

Bayesian channel estimation algorithms may rely on obtaining channel parameters for unknown channels based on pilot symbols and received orthogonal frequency-division multiplexing (OFDM) radio communication signals, in which the pilot symbols and data symbols are combined across time slots and subcarriers.

Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components.

In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Wireless communication technologies, and devices configured to perform the wireless communication technologies may employ artificial intelligence/machine learning algorithms to perform various operations. One example may be the Bayesian inference performing estimations with respect to various parameters of interest by treating them as random variables of a certain distribution. Bayesian inference may be employed to perform channel estimation, multiple input-multiple output (MIMO) detection, and MIMO decoding. In accordance with various aspects of this disclosure, Bayesian algorithms may be employed for the physical (PHY) layer.

Commonly, such signal processing techniques are provided by designated signal processors, or hardware accelerators that may provide various common processing functions that may not be particularly specific for the purpose.

Providing signal processing techniques for each signal processing operation in a communication device by designated signal processors for each of the techniques may be cumbersome. It may be desirable to employ a unified processor that may run various signal processing techniques for the PHY layer or multiple blocks within the PHY layer by providing an additional mechanism for the PHY layer signal processing with various performable functions in a flexible, and possibly in an adaptive manner.

Furthermore, it may be desirable to employ such unified processors to realize a family of various signal processing algorithms, especially with respect to the Bayesian inference. As indicated, Bayesian inference may be employed for various operations in the PHY layer, and it may be desirable to be able to operate different algorithms (e.g. mean field, expectation propagation) with respect to the Bayesian inference with an intention to cover different application scenarios.

Furthermore, due to the nature of OFDM signals, various signal processing mechanisms including the Bayesian inference may rely on processing portions of a received radio communication signal (e.g. one or more subcarriers) substantially in a simultaneous manner. It may be desirable to perform parallel computations with respect to the received radio communication signal with a single instructions.

Figure 3:
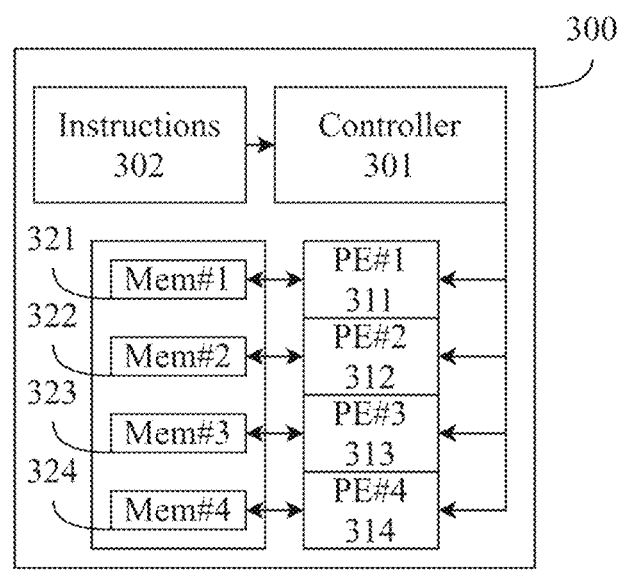
FIG. 3 exemplarily shows an illustration of a single instruction, multiple data (SIMD) architecture.

FIG. 3 exemplarily shows an illustration of a single instruction, multiple data (SIMD) architecture. The SIMD architecture 300 may include a controller configured to provide controlling functions for the SIMD architecture 300 based on instructions 302. The instructions 302 may be stored in a memory. The SIMD architecture 300 includes a plurality of processing elements 311, 312, 313, 314, in which the processing elements 311, 312, 313, 314 perform the same operations on multiple data points in the memory 321, 322, 323, 324 according to control instructions received from the controller 301 based on the instructions 302.

Accordingly, the SIMD architecture 300 may perform a single processing operation simultaneously on multiple data points. The processing operations may include retrieving data, performing arithmetic operations, or storing information. One example may include processing of different subcarriers of a received radio communication signal at the same time. Processing elements 311, 312, 313, 314 may accordingly simultaneously execute the same instruction over the data with respect to different subcarriers of the received radio communication signal.

Figure 4:
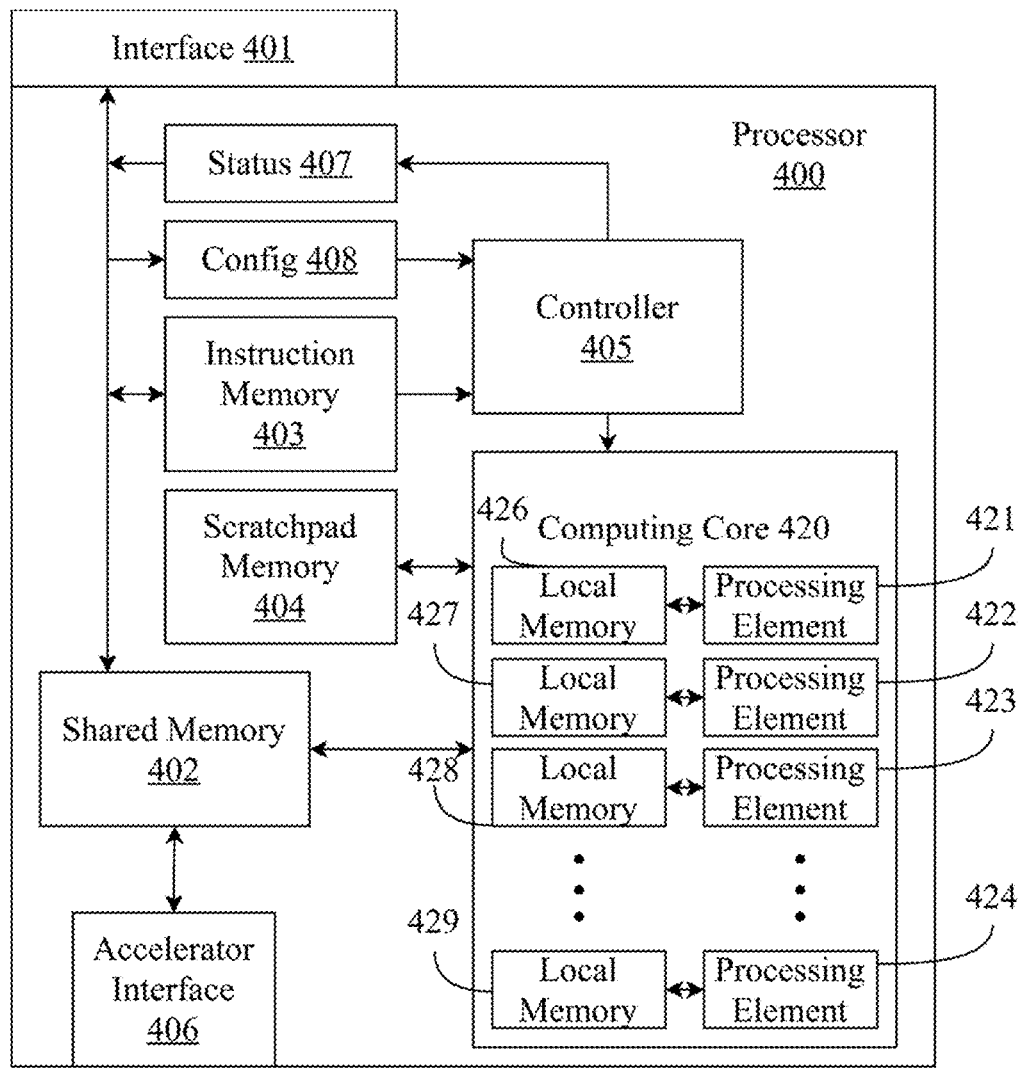
FIG. 4 shows an example of a processor.

FIG. 4 shows an example of a processor, in accordance with various aspects of this disclosure. The processor 400 may be of a SIMD architecture. The processor 400 may include a microcoded engine. The processor 400 may be a programmable microcoded engine. A microcode may refer to low-level instructions controlling the processor. In a programmable microcoded engine, the microcode may be configured to reprogram the microcoded engine based on received instructions.

The processor 400 may include an interface 401 to receive input data and instructions. The input data may include any type of data that the processor 400 may provide processing operations for. In the example provided with respect to processing subcarrier signals, the input data may include data obtained from received communication signal (i.e.) a plurality of subcarrier data representing subcarrier signals (e.g. subband data). The processor 400 may process the input data and provide an output including the processed data from the interface 401.

The interface 401 may be any type of interface suitable to transfer data according to aspects of this disclosure. The interface 401 may include a bus interface to transfer data according to any bus protocol. For exemplary purposes, the bus architecture may be an Advanced Microcontroller Bus Architecture (AMBA). The interface 401 may be an interface for Advanced High performance Bus (AHB) protocol. The interface 401 may be an interface for Advanced Xtensible Bus (AXB) protocol. The skilled person would recognize that the processor 400 may include any type of interface to transfer data in a designated processing system. In this illustrative example, the controller of the processor may include an input/output controller to control the interface 401. In various examples, the processor 400 may include a designated I/O controller according to the corresponding processing system.

The processor 400 may further include at least one memory element to store the received input data and the received instructions. The processor 400 may include a shared memory 402 configured to store the input data when the input data arrives to the processor 400. Furthermore, the processor 400 may include an instruction memory 403 configured to store the received instructions. Although the shared memory 402 and the instruction memory 403 are depicted in the illustrative example as separate entities, the processor 400 may include one memory as a shared memory and an instruction memory (and also for at least some of the other memories that are described with respect to the illustrative example). Accordingly, another entity over the interface 401 may access the shared memory 402.

Furthermore, the processor 400 may include a plurality of processing elements 421, 422, 423, 424. The illustration is depicted as there are four processing elements, but the processor 400 may include any number of processing elements configured to perform processing. The processor 400 may include a local memory (e.g. a processing element memory) for each of the processing elements 421, 422, 423, 424 associated with the respective processing element and configured to store data exclusively for the respective processing element. In this illustrative example, the first processing element 421 is coupled to a first local memory 426, the second processing element 422 is coupled to a second local memory 427, the third processing element 423 is coupled to a third local memory 428, and the fourth processing element 424 is coupled to a fourth local memory 429. In an example, the processor 400 may include a computing core 420 including the plurality of processing elements 421, 422, 423, 424, and their respective local memories 426, 427, 428, 429. The term computing core 420 will be used to collectively refer to the plurality of processing elements 421, 422, 423, 424 (and local memories 426, 427, 428, 429 for some of the examples) in this disclosure. The computing core 420 may access the shared memory 402.

The plurality of processing elements 421, 422, 423, 424 may be configured to perform a set of arithmetic operations, which will be referred to as a first set of arithmetic operations in this disclosure. The plurality of processing elements 421, 422, 423, 424 may perform any type of arithmetic operations. In one example, the plurality of processing elements 421, 422, 423, 424 may perform at least one of a real addition operation, a complex addition operation, a real multiplication operation, a complex multiplication operation, an accumulation operation, a real multiply and accumulate operation, a complex multiply and accumulate operation, a vector addition operation, an symbol probability calculation operation with an exponential configuration, an absolute value operation, a squared absolute operation, a real division operation, a real inverse operation, a maximum vector value operation, or a minimum vector value operation.

The plurality of processing elements 421, 422, 423, 424 may perform any combination of these arithmetic operations. The plurality of processing elements 421, 422, 423, 424 may perform any combination of these arithmetic operations based on the received instructions. In various examples, the plurality of processing elements 421, 422, 423, 424 may perform all of these arithmetic operations. In various examples, the plurality of processing elements 421, 422, 423, 424 may perform any one of these arithmetic operations based on the received instructions. In various examples, the received instructions may include one or more of these arithmetic operations or other arithmetic operations, and the plurality of processing elements 421, 422, 423, 424 may perform arithmetic operations based on the received instructions. In a SIMD architecture example, each processing element 421, 422, 423, 424 may perform the first set of arithmetic operations simultaneously based on the received instructions.

Furthermore, the processor 400 may include a scratchpad memory 404 coupled to the computing core 420 configured to store temporary data for the computing core 420. The scratchpad memory 404 may provide temporary storage of calculations, data, and other work in progress with respect to the processing operations of the computing core 420.

Furthermore, the processor 400 may include a controller 405 to control the processing operation (and other various aspects) of the processor 400 as provided with respect to this disclosure. The controller 405 may control the plurality of processing elements 421, 422, 423, 424 based on the received instructions stored in the instruction memory. The controller 405 may control a processing operation in which the plurality of processing elements 421, 422, 423, 424 performs the first set of arithmetic operations on the input data based on the received instructions. The controller 405 may further be coupled to the shared memory 402 to control the shared memory as well (not shown).

The received instructions stored in the instruction memory 403 may include microcode instructions. The controller 405 may accordingly control the processing operations (and may also control other operations) based on the microcode instructions. Accordingly, the controller 405 may decode the microcode instructions into provide instructions to the plurality of processing elements 421, 422, 423, 424 based on the microcode instructions.

For example, the microcode instructions may include instructions for the plurality of processing elements 421, 422, 423, 424 which arithmetic operations from the first set of operations to perform, order of the arithmetic operations, when to finalize the processing. The microcode instructions may further provide instructions with respect to other control operations of the controller 405. Other control operations may include when and how to control the shared memory 402, when and how to control the interface 401 to fetch data, etc. In various examples, the controller 405 may include a data fetch finite state machine (FSM) to control the interface 401 to receive input and provide output.

Furthermore, the processor may include an accelerator interface 406. The accelerator interface 406 may be any type of interface that at least provides an access to the shared memory 402 of the processor 400 for one or more accelerators. In various aspects, the controller 405 may also control the one or more processors over the accelerator interface 406. The accelerator interface 406 may be the same interface with the interface 401. In other words, the processor 400 may include only the interface 401 to receive input data and instructions, and provide access to the shared memory 402 for the one or more accelerators. In various aspects of this disclosure, the one or more accelerators are external to the processor 400. In an example, the processor 400 may also include the one or more accelerators.

Accordingly, the controller 405 may control the plurality of processing elements 421, 422, 423, 424 based on the received instructions for a processing operation in which the plurality of processing elements 421, 422, 423, 424 performs the first set of arithmetic operations and the one or more accelerators perform a second set of arithmetic operations based on the received input data stored in the shared memory 402. The controller 405 may control the processing operation as well.

The controller 405 may control the plurality of processing elements 421, 422, 423, 424 to perform the first set of arithmetic operations based on the received instructions according to the received input data. The controller 405 may further control the one or more accelerators to perform the second set of arithmetic operations based on the received instructions according to the received input data. Accordingly, the plurality of processing elements 421, 422, 423, 424 may perform the first set of arithmetic operations and the one or more accelerators may perform the second set of arithmetic operations collectively to process the input data and, as a result, to obtain the processed data.

For example, the second set of arithmetic operations that the one or more accelerators may perform may include at least one of a matrix multiplication for a matrix up to 4 by 4 by size, a fast Fourier transform (FFT) operation up to 16 point FFT, a set of butterfly operations to combine previously calculated FFTs, a matrix inverse operation, a vector multiplication operation, or a vector addition operation.

The one or more accelerators may perform any combination of these arithmetic operations. The one or more accelerators may perform any one or any combination of these arithmetic operations based on received instructions from the one or more accelerators. The one or more accelerators may receive the instructions from the controller 405 or another controller. In various examples, the one or more accelerators may perform all of these arithmetic operations. In various examples, the one or more accelerators may perform any one of these arithmetic operations based on the received instructions. In various examples, the received instructions by the one or more accelerators may include one or more of these arithmetic operations or other arithmetic operations, and the one or more accelerators may perform arithmetic operations based on the received instructions by the one or more accelerators.

In various examples that the controller 405 may control the one or more accelerators, the received instructions may also include microcode instructions providing instructions to control the one or more accelerators. The microcode instructions may include instructions to control the one or more accelerators by indicating which arithmetic operations from the second set of operations to perform, order of the arithmetic operations, when to finalize the processing.

Accordingly, the received instructions may include microcode instructions for the controller 405 to control the plurality of processing elements 421, 422, 423, 424 and the one or more accelerators collectively to process the input data according to one or more signal processing algorithms. For example, the received instructions may include microcode instructions, in which the controller 405 may control the plurality of processing elements 421, 422, 423, 424 and the one or more accelerators to perform a Bayesian channel estimation algorithm.

The received instructions may include microcode instructions, in which the controller 405 may control the plurality of processing elements 421, 422, 423, 424 and the one or more accelerators to perform a Bayesian algorithm for wireless applications. The received instructions may include microcode instructions, in which the controller 405 may control the plurality of processing elements 421, 422, 423, 424 and the one or more accelerators to perform a physical layer signal processing algorithm. Another controller (e.g. main processor) may provide different instructions to make the processor 400 to perform any one of these algorithms (or other algorithms).

The shared memory 402 may include predefined memory locations in which the one or more accelerators may access and the one or more accelerators may perform the second set of arithmetic operations based on the data in the predefined memory locations. The controller 405 may control the one or more accelerators to perform the second set of operations based on the data in a memory location that the controller 405 may indicate.

The controller 405 may control the plurality of processing elements 421, 422, 423, 424 to process the data in the shared memory that is based on the received input data according to a double buffering operation in which the input data may include at least two data elements to be processed for each of the plurality of processing elements 421, 422, 423, 424 at two different memory locations, and the controller 405 may control each of the plurality of processing elements 421, 422, 423, 424 to process one of the two data elements. Once the collective processing by the respective processing element and the one or more accelerators for the one of the two data elements is complete, the respective processing element and the one or more accelerators may perform processing on the other one of the two data elements, while the controller 405 may provide the output including the one of the two data elements and the shared memory 402 may have a new data element to be processed when the one or more accelerators and the respective processing element finishes processing the other one of the two data elements.

Figure 5:
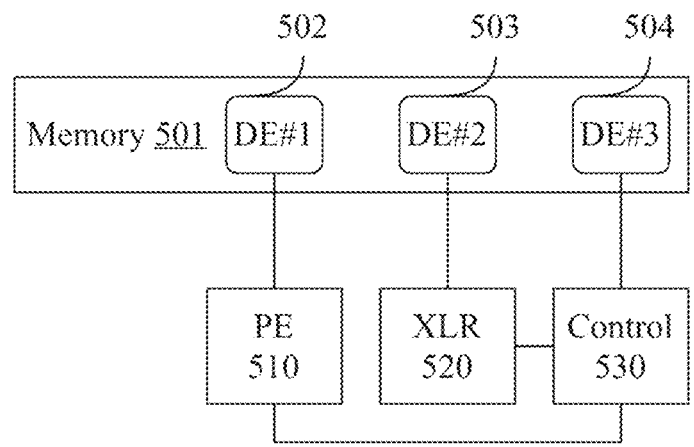
FIG. 5 shows an illustration with respect to a buffering operation according to various aspects of this disclosure.

FIG. 5 shows an illustration with respect to a buffering according to various aspects of this disclosure. Similar to the double buffering technique, in this example a memory 501 (e.g. the shared memory 402) may include at least three data elements from the input data for each of the processing elements, including a first data element 502, a second data element 503, and a third data element 504. A controller 530 (e.g. the controller 405) may control a processing element 510 and one or more accelerators 520 to process the first data element 502 and the second data element 503 collectively, and the third data element 503 may left for providing the output and receiving a new data element by the controller 530.

In this illustrative example, the third data element 504 may include a processed data. Accordingly, while the processing element 510 and the one or more accelerators 520 may process the first data element 502 and the second data element 503, the controller 530 may output the third data element 504 and provide a new data element to be processed for the collective processing. Although the order of the arithmetic operations that the processing element 510 and the one or more accelerators 520 may perform may require more signaling in-between, and the size of the memory 501 may increase, it may be desirable to perform such buffering.

Each data element may include subcarrier data according to the example with respect to subcarrier processing.

Referring back to FIG. 4, the controller 405 may also perform other operation of the processor 400. The processor 400 may include a configuration memory 408 including one or more configuration registers to provide indications with respect to the configuration of the processor 400 for the controller 405 to use.

The processor 400 may include a status memory 407 (e.g. one or more status registers) configured to store status information indicating the operational status of the processor 400. The controller 405 may set the status memory 407 based on the operations of the computing core 420, e.g. indicating by the status registers that the computing core 420 performs processing based on the received instructions (or not). Furthermore, the status memory 407 may further include one or more accelerator registers, and the controller 405 may set the status memory 407 based on the operations of the one or more accelerators, e.g. indicating by the one or more accelerator registers that the one or more accelerators is employed by the processor 400.

For example, once the controller 405 starts to control the plurality of processing elements 421, 422, 423, 424, the controller 405 may set the one or more status registers indicating that the controller 405 controls the plurality of processing elements 421, 422, 423, 424 to process the data in the memory. Once the plurality of processing elements 421, 422, 423, 424 finishes to perform the second set of arithmetic operations for the processing, the controller 405 may set the one or more status registers indicating that the plurality of processing elements 421, 422, 423, 424 is in an idle mode.

Once the controller 405 starts to control the one or more accelerators, the controller 405 may set the one or more accelerator registers indicating that the controller 405 controls the one or more accelerators to process the data in the memory. Once the one or more accelerators finishes to perform the second set of arithmetic operations for the processing, the controller 405 may set the one or more accelerator registers indicating that the one or more accelerators are in an idle mode. In various examples, the controller 405 may send an information indicating the status of the plurality of processing elements 421, 422, 423, 424 or the status of the one or more accelerators over the interface 401 to another entity.

Furthermore, the controller 405 may prevent the access of the one or more accelerators to the shared memory 402 when the one or more accelerators finishes to perform the second set of arithmetic operations for the processing. The controller 405 may disable the accelerator interface 406 to prevent the access of the one or more accelerators to the shared memory, when the processor 400 operates in an idle mode.

The processor 400 operating in an idle mode may refer to an operation mode in which the shared memory has no input data for processing of the computing core 420 or the one or more accelerators. The controller 405 may set the processor 400 in the idle mode when the processing of the input data finishes. The controller 405 may set the processor 400 in the idle mode when the processor 400 outputs the processed data and there is no further input data in the shared memory 402. The controller 405 may set the processor 400 in the idle mode when the processor receives an instruction indicating an end for the processing.

In various examples, the processor 400 may receive a plurality of instructions from the interface 401 and store the plurality of instructions in the instruction memory 403. Accordingly, the controller 405 may control the operations of the processor 400 according to the received plurality of instructions. The processor 400 may further receive scheduling information indicating a schedule for each of the instructions of the plurality of instructions. Accordingly, the controller 405 may control the operations of the processor 400 based on the plurality of instructions and the scheduling information.

As an example, the received plurality of instructions may include a first set of instructions with respect to process the input data according to a Bayesian channel estimation algorithm, and a second set of instructions with respect to process the input data according to another signal processing algorithm at the PHY layer. The scheduling information may indicate to perform the first set of instructions at a first instance of time and to perform the second set of instructions at a second instance of time. Accordingly, the controller 405 may control the computing core 420 and the one or more accelerators (and other elements of the processor 400) to perform the first set of instructions at the first instance of time, and the controller 405 may control the computing core 420 and the one or more accelerators (and other elements of the processor 400) to perform the second set of instructions at the second instance of time.

In various examples, the processor 400 may be selectively couplable to one or more accelerators to receive a service with respect to processing the input data. For example, each one of the one or more accelerators may not be available all the time, or the one or more accelerators may perform different sets of arithmetic operations. Accordingly, the controller 405 may select the one or more accelerators that provide the second set of arithmetic operations to process the input data (e.g. from a plurality of accelerators).

Figure 6:
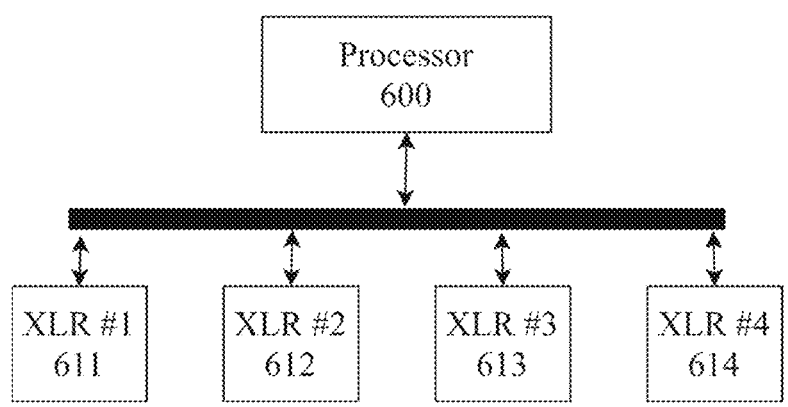
FIG. 6 shows an illustration with respect to the processor and one or more accelerators.

FIG. 6 shows an illustration with respect to the processor and one or more accelerators. A processor 600 (e.g. the processor 400) may be coupled over a bus interface with a first accelerator 611, a second accelerator 612, a third accelerator 613, and a fourth accelerator 614. A controller of the processor 600 (e.g. the controller 405) may select one or more from the accelerators 611, 612, 613, 614. The controller select one or more accelerators from the accelerators 611, 612, 613, 614 based on the received instructions.

The received instructions may include information indicating the one or more accelerators from the accelerators 611, 612, 613, 614. The indication may include an identifier for the corresponding one or more accelerators to be selected from the one or more accelerators. In various examples, the processor 600 may receive acceleration availability information, and the processor 600 may select one or more accelerators from the accelerators 611, 612, 613, 614 based on their availability. The processor 600 may receive the acceleration availability information from each of the accelerators 611, 612, 613, 614 or from another entity (e.g. another processor).

In various examples, the processor 600 may receive information indicating the capabilities of the accelerators 611, 612, 613, 614, especially in terms of the arithmetic operations that the accelerators 611, 612, 613, 614 may perform. The controller may select one or more accelerators from the accelerators 611, 612, 613, 614 based on the received information. For example, the processor 600 may obtain the information from the received instructions.

Figure 7:
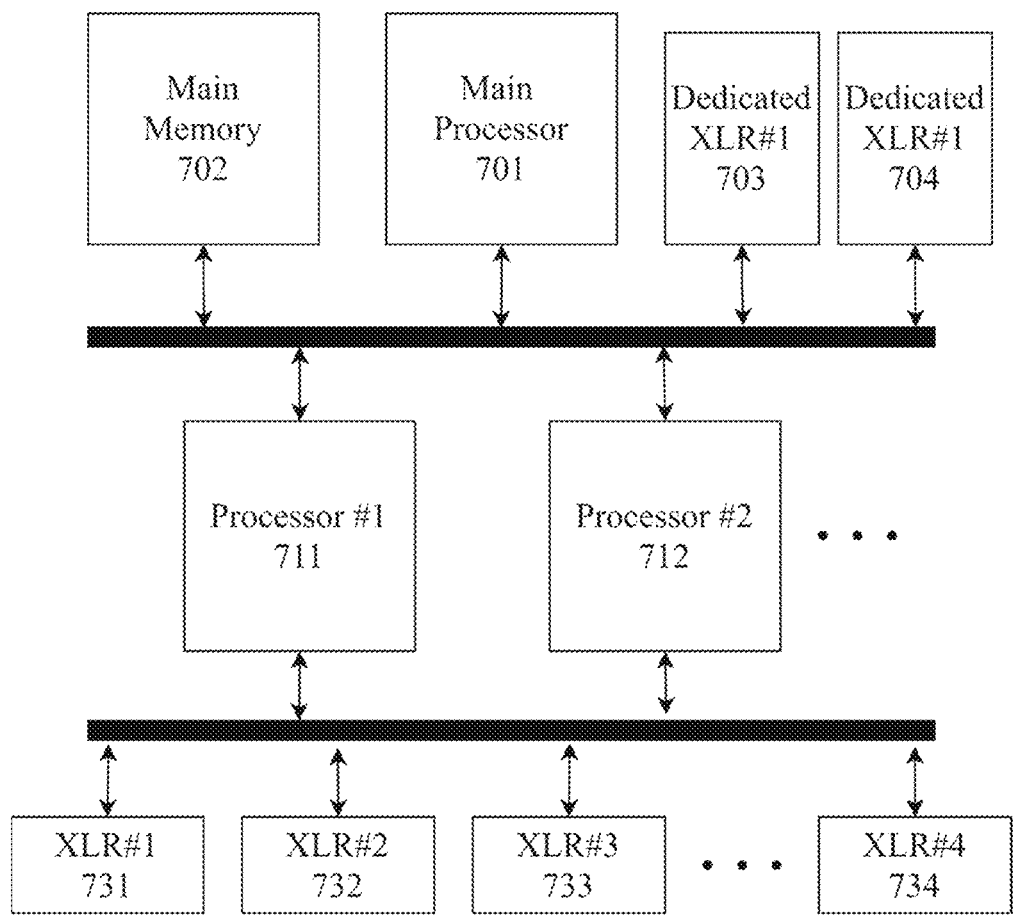
FIG. 7 shows an example of a processing system.

FIG. 7 shows an example of a processing system. The processing system 700 may be a processor of a device. The device may be a communication device. The processing system 700 be implemented in one processing unit, e.g. a system on chip (SoC), or a processor. A cellular baseband SoC may implement the processing system 700. The processing system 700 may include a main processor 701. The main processor 701 may include a host processor, or any type of processors that operates as provided within this disclosure. The main processor 701 may execute a firmware for signal processing. The processing system 700 may include a main memory 702 associated with the main processor 701 for the processing system 700 to store data.

The processing system 700 may further include a plurality of dedicated accelerators 703, 704 to perform designated processing for various operations. The plurality of dedicated accelerators 703, 704 may provide designated processing operations under the control of the main processor 701. The main processor 701 may control the plurality of dedicated accelerators to perform operations in a designated sequence and/or order, especially for the purpose of processing signals for time critical operations. For example, the plurality of dedicated accelerators may include Low-density Parity-check (LDPC) coders, turbo decoders, Fast Fourier Transform (FFT) engines, etc.

The processing system 700 may further include at least a processor 711 according to various aspects of this disclosure (e.g. the processor 400). The processor 711 may include an interface configured to receive input data and instructions and provide output data including processed data. The processor 711 may include a shared memory configured to store received input data. The processor 711 may include an instruction memory configured to store received instructions. The processor 711 may further include a plurality of processing elements configured to perform a first set of arithmetic operations.

Furthermore, the processor 711 may include a controller that is configured to control the processing elements to process the received input data with one or more accelerators 731, 732, 733, 734 of the processing system 700. The controller may control the processing elements to process the received input data in the shared memory of the processor 711 based on the received instructions to obtain the processed data. The processor 711 may receive the instructions from the main processor 701.

The processing system 700 may include more processors similar to the processor 711. Although, it is depicted in the illustrative example, such that the processing system 700 includes the Processor #1 711 and a Processor #2 712 that may operate with the same mechanisms to the processor 711, the processing system 700 may include any number of processors that are provided in this disclosure, operating in the same manner with respect to the processor 700.

Furthermore, the processing system may include a plurality of accelerators 731, 732, 733, 734. Although, it is depicted in the illustrative example, such that the processing system 700 includes four accelerators, the processing system may include any number of accelerators. In various examples, capability of each one of the plurality of accelerators 731, 732, 733, 734 may be less than the plurality of designated accelerators 703, 704.

For example, the plurality of accelerators 731, 732, 733, 734 may perform less complex processing operations than the plurality of designated accelerators 703, 704. For example, the plurality of accelerators 731, 732, 733, 734 may perform at least one of a matrix multiplication for a matrix up to 4 by 4 by size, a fast Fourier transform (FFT) operation up to 16 point FFT, a set of butterfly operations to combine previously calculated FFTs, a matrix inverse operation, a vector multiplication operation, or a vector addition operation.

The plurality of accelerators 731, 732, 733, 734 may perform any combination of these arithmetic operations. The plurality of accelerators 731, 732, 733, 734 may perform any one or any combination of these arithmetic operations based on received instructions from the plurality of accelerators. 731, 732, 733, 734. The plurality of accelerators 731, 732, 733, 734 may receive the instructions from a controller. of one of the processors 711, 712. In various examples, the plurality of accelerators may perform all of these arithmetic operations.

In various examples, the plurality of accelerators 731, 732, 733, 734 may perform any one of these arithmetic operations based on the received instructions. In various examples, the received instructions received by the plurality of accelerators 731, 732, 733, 734 may include one or more of these arithmetic operations or other arithmetic operations, and the plurality of accelerators 731, 732, 733, 734 may perform arithmetic operations based on the received instructions by the plurality of accelerators 731, 732, 733, 734. In various examples, one of the processor 711, 712 and/or the main processor 701 may provide these instructions.

The main memory 702 may include a set of instructions for each processing algorithm that the processors 711, 712 may perform as provided in this disclosure. The set of instructions may include a set of microcode instructions, configured to perform a signal processing operation according to the algorithm. As provided in this disclosure, the algorithms may include a Bayesian channel estimation algorithm, a Bayesian algorithm for wireless applications, a PHY layer signal processing algorithm, however this should not be considered as limiting, and instructions may provide instructions to realize any type of signal processing algorithm that the processors 711, 712 may perform based on their arithmetic operators of the plurality of processing elements, and their set of arithmetic operations, and also based on arithmetic operations that the plurality of accelerators 731, 732, 733, 734 may perform. In various examples, the main processor 701 may add new set or sets of instructions to the main memory 702 or remove one or more sets of instructions.

The main processor 701 may provide one set of instructions to the processors 711, 712. Accordingly, the processors 711, 712 may perform the same processing operations to process different input data. For example, the main processor 701 may provide a number of subband data with respect to a number of subcarriers based on received radio communication signal to each of the processors 711, 712 with an intention to process more subband data for an instance of time. In various examples, at least a portion of the subband data that the main processor 701 may provide can overlap.

The main processor 701 may provide a first input data including a number of subband data with respect to a number of subcarriers based on a received radio communication signal at a first instance of time to the processor 711, and the main processor 701 may provide a second input data including a number of subband data with respect to a number of subcarriers based on a received radio communication signal at a second instance of time to the second processor 712.

The main processor 701 may provide a first set of instructions to the processor 711 to make the processor 711 to perform a first signal processing operation, and the main processor 701 may provide a second set of instructions to the second processor 711 to make the second processor 712 to perform a second signal processing operation. In various examples, the input data of one of the processors 711, 712 may be output data of another one of the processors 711, 712.

When the processors 711, 712 completes processing input data, the processors 711, 712 may provide an indication that the processing is complete. The processors 711, 712 may provide the indication by sending an indication to the main processor 701. The processors 711, 712 may provide the indication by setting their status registers. The main processor 701 may then fetch the processed data from the processors 711, 712 to obtain the processed data via the interface. The respective controller of the processors 711, 712 may also control the interface to provide the processed data to the main processor 701.

The processed data for each of the processors 711, 712 is the resulting data after the processing elements and the associated one or more accelerators have performed their set of arithmetic operations collectively based on the received instructions by the respective processor of the processors 711, 712. The processed data may include information naturally depending on the algorithm that the main processor 701 instruct by providing the corresponding instructions. The processed data may include detected channel parameters based on the received subband data (e.g. mean and variance with respect to the provided subband data).

As provided in accordance with various aspects of this disclosure, the main processor 701 may also provide scheduling information to the processors 711, 712 to schedule various aspects, such as a plurality of instructions, but the scheduling information may further indicate the processors 711, 712 when to perform processing operations, or when the processors 711, 712 may operate with one or more of the plurality of accelerators 731, 732, 733, 734.

In accordance with various aspects of this disclosure, the main processor 701, the main memory 702, the designated accelerators 703, 704, and the processors 711, 712 may have interfaces to communicate over a bus based on any protocols. As indicated in various examples in this disclosure, the bus protocols that the processing system 700 may use may include AHB and/or AXI.

In this illustrative example, it is depicted in a manner that the processors 711, 712 and the plurality of accelerators 731, 732, 733, 734 may be connected over a bus structure. Accordingly, they may also include an AHB and/or AXI bus interface. However, this is only provided as an example, and any other connection scenarios and methods are also possible, some of which may be provided in this disclosure. For example, the main processor 701, the main memory 702, the processors 711, 712, and the accelerators 731, 732, 733, 734 may communicate over the same bus. In various examples, each of the processors 711, 712 may include at least one of the accelerators 731, 732, 733, 734. In various examples, each of the processors 711, 712, may be directly coupled to one or more of the accelerators 731, 732, 733, 734.

Each of the processors 711, 712 may selectively communicate and receive services from one or more of the accelerators 731, 732, 733, 734. Accordingly, the controller of a respective processor of the processors 711, 712, may select one or more accelerators from the plurality of accelerators 731, 732, 733, 734 to receive a service with respect to the arithmetic operations performed by the selected one or more accelerators. With respect to this aspect, the processing operations that an accelerator may provide by performing the set of arithmetic operations designated by the accelerator may be referred to as "service" in this disclosure.

The main processor 701 may monitor the status of each of the accelerators 731, 732, 733, 734 and provide accelerator status information to the processors 711, 712 upon a request, or with the instructions that the main processor 701 may send to the processors 711, 712. Alternatively, the main processor 701 may generate and maintain the accelerator status information in the main memory 702, so that the processors 711, 712 may access or may fetch information when needed. The main processor 701 may monitor the status of each of the accelerators 731, 732, 733, 734 based on data that the main processor 701 may receive from the accelerators 731, 732, 733, 734, or the main processor 701 may identify accelerators that the processor may control at an instance of time based on the status registers (one or more accelerator status registers) of the processors 711, 712.

Accordingly, the controllers of the processors 711, 712 may select one or more accelerators from the accelerators 731, 732, 733, 734 based on their availability according to the accelerator status information.

In various examples, the processors 711, 712 may receive accelerator operation information for each of the accelerators 731, 732, 733, 734 indicating arithmetic operations that each of the accelerators 731, 732, 733, 734 may perform from the main processor 701. Alternatively, the main memory 701 may include the accelerator operation information for each of the accelerators 731, 732, 733, 734, and the controllers of the processors 711, 712 may access or receive the accelerator operation information from the main memory 701. Accordingly, the controllers of the processors 711, 712 may select one or more accelerators from the accelerators 731, 732, 733, 734 based on the accelerator operation information and the received instructions by the processors 711, 712.

Once one of the processors 711, 712 begins to receive a service from one or more of the accelerators 731, 732, 733, 734, the controller of the respective processor may generate accelerator service information indicating the one or more of the accelerators 731, 732, 733, 734 are scheduled to perform arithmetic operations in the shared memory of the respective processor. In various examples, the main processor 701 may generate and maintain the accelerator status information based on the accelerator service information received from each of the processors 711, 712.

Furthermore, the main processor 701 may oversee the status of each of the processors 711, 712 and the accelerators 731, 732, 733, 734 based on instructions that the main processor 701 may provide to the each of the processors 711, 712 to control whether the status of each of the processors 711, 712 and the accelerators 731, 732, 733, 734 correspond to the instructions that the main processor 701 has provided. The main processor 701 may detect an anomaly based on the processor-accelerator pairings with respect to the instructions that the main processor provides to each of the processors 711, 712 and terminate the processing or restart the processing operation.

Accordingly, in the processing system 700 the main processor 701 can program multiple instances of the processors 711, 712, to realize different functionalities in a pipelined fashion. At the design time, the main processor 701 may designate the processing instances to support same/different instruction sets or a common set with some specialized instructions in each or a few instance. In various examples, the processors 711, 712 may include different numbers of processing elements.

Figure 8:
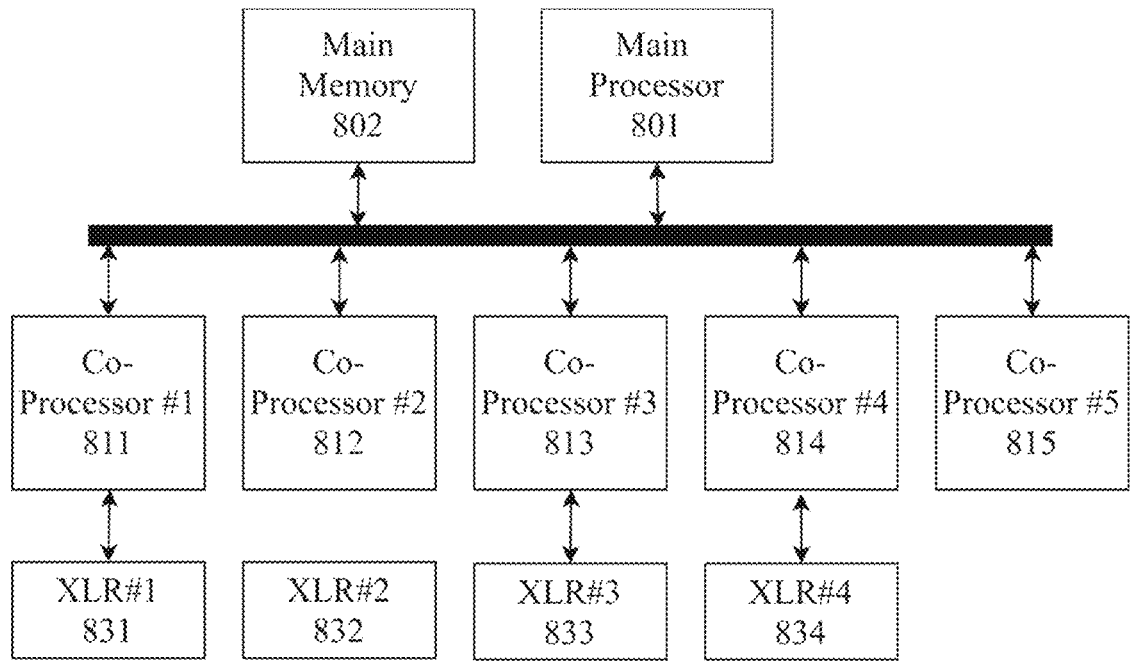
FIG. 8 shows an example of a processing system.

FIG. 8 shows an example of a processing system in accordance with various aspects of this disclosure. The processing system 800 may include a main processor 801, a main memory 802 communicatively coupled to a number of processors over a bus. The processors are depicted in the example as co-processors 811, 812, 813, 814, 815 which may include microcoded engines with SIMD architecture (as exemplarily provided as the processor 200), and a number of accelerators 831, 832, 833, 834. The arrows between the co-processors and the accelerators illustrate the pairings between respective co-processor and the respective accelerator. Similar to other examples, the numbers provided in this illustrative example are only provided as examples.

Accordingly, the first co-processor 811 may be paired with the first accelerator 831 and accordingly, processing elements of the first co-processor 811 and the first accelerator 831 may perform their respective set of arithmetic operations to process input data at the shared memory of the first co-processor 811 based on instructions received from the main processor 801 to obtain processed data at the first co-processor 811. The third co-processor 813 may be paired with the third accelerator 833 and accordingly, processing elements of the third co-processor 813 and the third accelerator 833 may perform their respective set of arithmetic operations to process input data at the shared memory of the third co-processor 813 based on instructions received from the main processor 801 to obtain processed data at the third co-processor 813. Similarly, the fourth co-processor 814 may be paired with the fourth accelerator 834 and accordingly, processing elements of the fourth co-processor 814 and the fourth accelerator 834 may perform their respective set of arithmetic operations to process input data at the shared memory of the fourth co-processor 814 based on instructions received from the main processor 801 to obtain processed data at the fourth co-processor 814.

The pairings provided above may include pairings based on the design of the processing system 800, in a manner that the co-processor-accelerator pairs are designated and cannot be changed. Alternatively, the pairings may include pairings that may be adjusted based on instructions received from the main memory 801, or instructions received from the respective co-processors as provided in various examples in this disclosure. Accordingly, the paired co-processors 811, 813, 814 may have selected the respective accelerators, exemplarily as provided in this disclosure based on the availability of the accelerators, arithmetic operations that the accelerators may perform, received instructions from the main processor 801, etc.

In a constellation that the provided co-processor-accelerator pairs, namely a first pair of the first co-processor 811 and the first accelerator 831, a second pair of the third co-processor 813 and the third accelerator 833, and a third pair of the fourth co-processor 814 and the fourth accelerator 834, are designated pairs, the processing system may include a number of shared accelerators including the second accelerator 832 in this illustrative example. Any one of the co-processors, also including the first co-processor 811, the third co-processor 813, and the fourth co-processor 814, may be paired with the shared accelerators to receive services from the corresponding shared accelerators based on their received instructions.

Such structure may provide further flexibility to the processing system, especially in various cases that the main processor 801 may control the co-processors to perform various types of processing with different algorithms, and some of the algorithms may be performed only by processing elements of the respective co-processors (e.g. the second co-processor 812, and the fifth co-processor 815) without involvement of at least some of the shared accelerators. However, other combinations may also be subject to the example of the processing system 800.

In this illustrative example, the main processor 801 may intend to send instructions to the fifth co-processor 815 indicating an involvement of an accelerator. The main processor 801 may identify an available accelerator from the accelerators 831, 832, 833, 834 based on the accelerator status information. The main processor 801 may access the accelerator status information by reading status registers of the co-processors 811, 812, 813, 814, 815. In this illustrative example, the main processor 801 may identify that the first accelerator 831, the third accelerator 833, and the fourth accelerator 834 are already paired (e.g. locked) with the respective co-processors.

Accordingly, the main processor 801 may assign the second accelerator 832 for the fifth co-processor 815. In various examples, the main processor 801 may further check arithmetic operations performed by available accelerators (or all other accelerators) in the processing system 800 from the accelerator operation information, and the main processor 801 may identify that one of the available accelerators may allow the realization of the instructions to be sent to the fifth co-processor 815, and the main processor 801 may assign the second accelerator 832 for the fifth co-processor 815 based on the accelerator operation information. As indicated in various examples in this disclosure, a co-processor (e.g. the fifth co-processor 815) may also select one of the accelerators (e.g. the second accelerator 832) based on the accelerator status information or accelerator operation information.

Once the fifth co-processor 815 receives the instructions, the fifth co-processor 815 may pair with the second accelerator 832 based on the received instructions and perform instructions and accordingly process an input data that the fifth co-processor 815 receives by processing elements of the fifth co-processor 815 and the second accelerator 832 in a cooperative manner. Accordingly, the fifth co-processor 815 may set its status registers indicating that the fifth co-processor 815 is busy and paired with the second accelerator 832.

Furthermore, the main processor 801 may check the accelerator status information for each of the co-processors and determine unused accelerators or detect any conflicts that may arise based on a misconfiguration of the main processor 801 or a misconfiguration based on selections of the co-processors. Accordingly, the main processor 801 may issue new instructions to restart or cancel the processing task at the co-processors that the main processor 801 may detect the misconfiguration.

Figure 9:
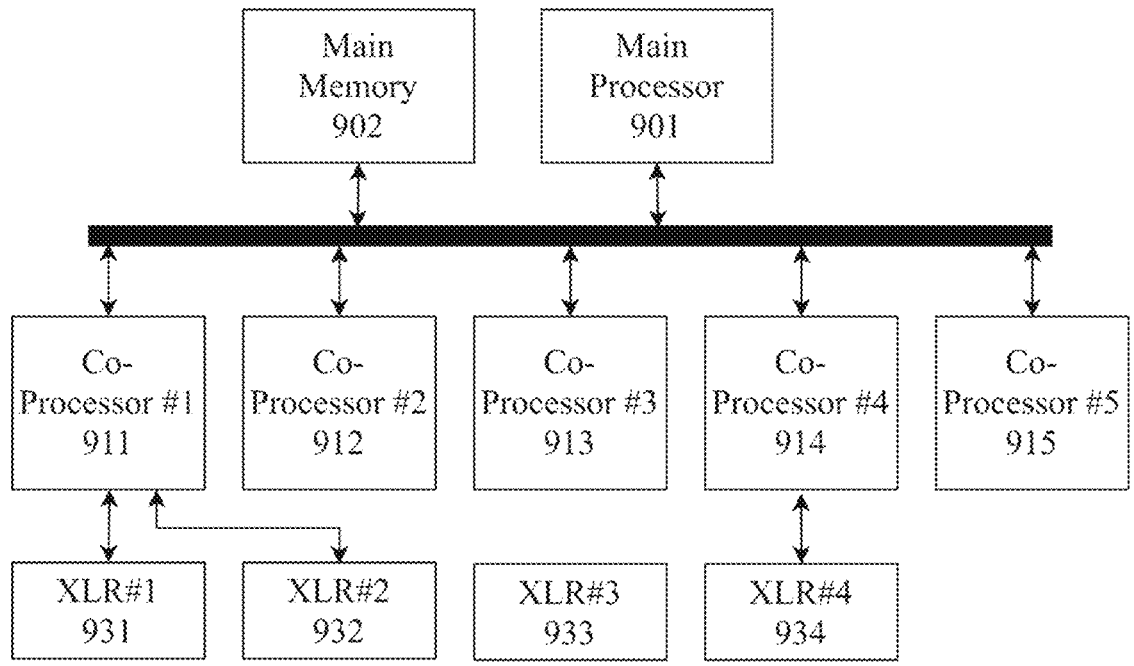
FIG. 9 shows an example of a processing system.

FIG. 9 shows an example of a processing system. The processing system 900 may include a main processor 901, a main memory 902 communicatively coupled to a number of processors over a bus. The processors are depicted in the example as co-processors 911, 912, 913, 914, 915 which may include microcoded engines with SIMD architecture (as exemplarily provided as the processor 200), and a number of accelerators 931, 932, 933, 934. The arrows between the co-processors and the accelerators illustrate the pairings between respective co-processor and the respective accelerator. Similar to other examples, the numbers provided in this illustrative example are only provided as examples.

Accordingly, the first co-processor 911 may be paired with the first accelerator 931 and the second accelerator 932, and accordingly, processing elements of the first co-processor 911 and the first accelerator 931 and the second accelerator 932 may perform their respective set of arithmetic operations to process input data at the shared memory of the first co-processor 911 based on instructions received from the main processor 901 to obtain processed data at the first co-processor 911.

For this example, the processing elements of the first co-processor 911 may perform a first set of arithmetic operations, the first accelerator 931 may perform a second set of arithmetic operations, and the second accelerator 932 may perform a third set of arithmetic operations based on the instructions that the main processor 901 may provide. Similarly, the fourth co-processor 914 may be paired with the fourth accelerator 934 and accordingly, processing elements of the fourth co-processor 914 and the fourth accelerator 934 may perform their respective set of arithmetic operations to process input data at the shared memory of the fourth co-processor 914 based on instructions received from the main processor 901 to obtain processed data at the fourth co-processor 914.

Figure 10:
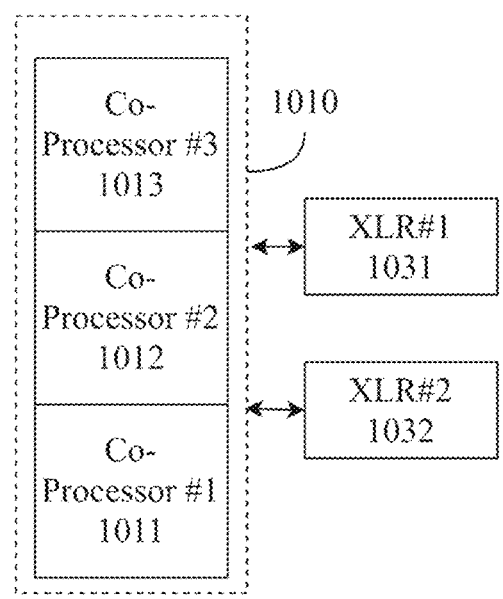
FIG. 10 shows an illustration with respect to a processing system.

FIG. 10 shows an illustration with respect to a processing system. In this illustrative example, the remaining parts of the processing system are omitted. The illustration depicts a first co-processor 1011, a second co-processor 1012, a third co-processor 1013, operating in a stacked mode. The stack of processors 1010 is paired with a first accelerator 1031, and a second accelerator 1032. The stack of processors 1010 may resemble stacking each co-processors physically, or logically by providing their input data and instructions to perform the processing operation in a stacked fashion with an intention to form a larger processor capable of perform more processing operations.

This illustration depicts three co-processors in a stacked configuration, but it may be any number of co-processors. In various examples, limitation with respect to such a configuration may be defined by various matters such as memory bandwidth, incompatibility of instruction sets across engines and so on. The configuration can also make use of one or several accelerators to leverage added capability of the engines in this configuration.

In such configuration, it may also be possible for at least one of the co-processors to process a processed data of another co-processor. For example, the first co-processor 1011 may receive input data from a main processor (not shown), and perform a set of arithmetic operations (e.g. a first set of arithmetic operations) with a second set of arithmetic operations of at least one of the accelerators 1031, 1032 in a cooperative manner, and provide first processed data as output, in which the second co-processor 1012 may receive the first processed data as input data and perform a set of arithmetic operations (e.g. a third set of arithmetic operations) with a set of arithmetic operations (e.g. the second set, or a fourth set) of the at least one of the accelerators 1031, 1032 in a cooperative manner, and provide a second processed data as output.

Similarly, the third co-processor 1013 may receive the second processed data as input data and perform a set of arithmetic operations with a set of arithmetic operations of at least one of the accelerators 1031, 1032 in a cooperative manner, and provide output as the first processed data.

The stacked processing may involve any other combinations as well. For example, the second co-processor 1012, and the third co-processor 1013 may both receive the first processed data as input data and perform different algorithms based on different instructions received from the main processor. The set of arithmetic operations that all of the co-processors 1011, 1012, 1013 may be the same set, however each co-processor 1011, 1012, 1013 may perform their operations based on different instructions, etc.

As indicated, the processors may be used to perform Bayesian channel estimation. In such case, the set of instructions that a processor and an accelerator may collectively perform, may include the instructions below:

| Instruction | Equation | Description |
| --- | --- | --- |
| CMULT | $a \cdot b$ | Complex multiplication. |
| CADD | $a + b$ | Complex addition. |
| CMAC | $a \cdot b + c$ | Complex multiply & acc. |
| CMULT_CONJ | $a \cdot \text{conj}(b)$ | Complex multiplication with a conjugate |
| CADD_CONJ | $a + \text{conj}(b)$ | Complex Add with a conjugate |
| CMAC_CONJ | $a \cdot \text{conj}(b) + c$ | CMAC with a conjugate |
| CMULT_CONST | $a \cdot k$ | Complex multiplication with a constant. |
| CADD_CONST | $a + k$ | Complex Add with a constant. |
| CMAC_CONST | $a \cdot k + c$ | Complex MAC with constant. |
| ADD4 | $\Sigma \text{Re}(a_i)$ | Accumulate 4 Real inputs. |
| DIV | $\text{Re}(a) \div \text{Re}(b)$ | Real division. |
| INV | $1 \div \text{Re}(a)$ | Real inverse. |
| absAsq_plus_B | $|a|^2 + \text{Re}(b)$ | Squared absolute of cplx number plus real operand. |
| absAsq_plus_B_inv | $\dfrac{1}{|a|^2 + \text{Re}(b)}$ | Inverse of $|a|^2 + \text{Re}(b)$ |
| A_minus_absBsq | $\text{Re}(a) - |b|^2$ | |
| SYMPROB4 | $\dfrac{1}{c^2} e^{\dfrac{-|a-b|^2}{c^2}}$ | Symbol probability calc. |
| RD_PE_MEM | | Read data from PE memory to co-processor. |
| RD_RESULT | | Read results from co-processor to PE memory. |
| MAT_VEC_MUL | $[A] \cdot b$ | Matrix vector mult. |
| MAT_INV_UPDATE | $[A]^{-1} + [X]^{-1}$ | Matrix inverse update. |
| NOP | — | No operation. |

Figure 11:
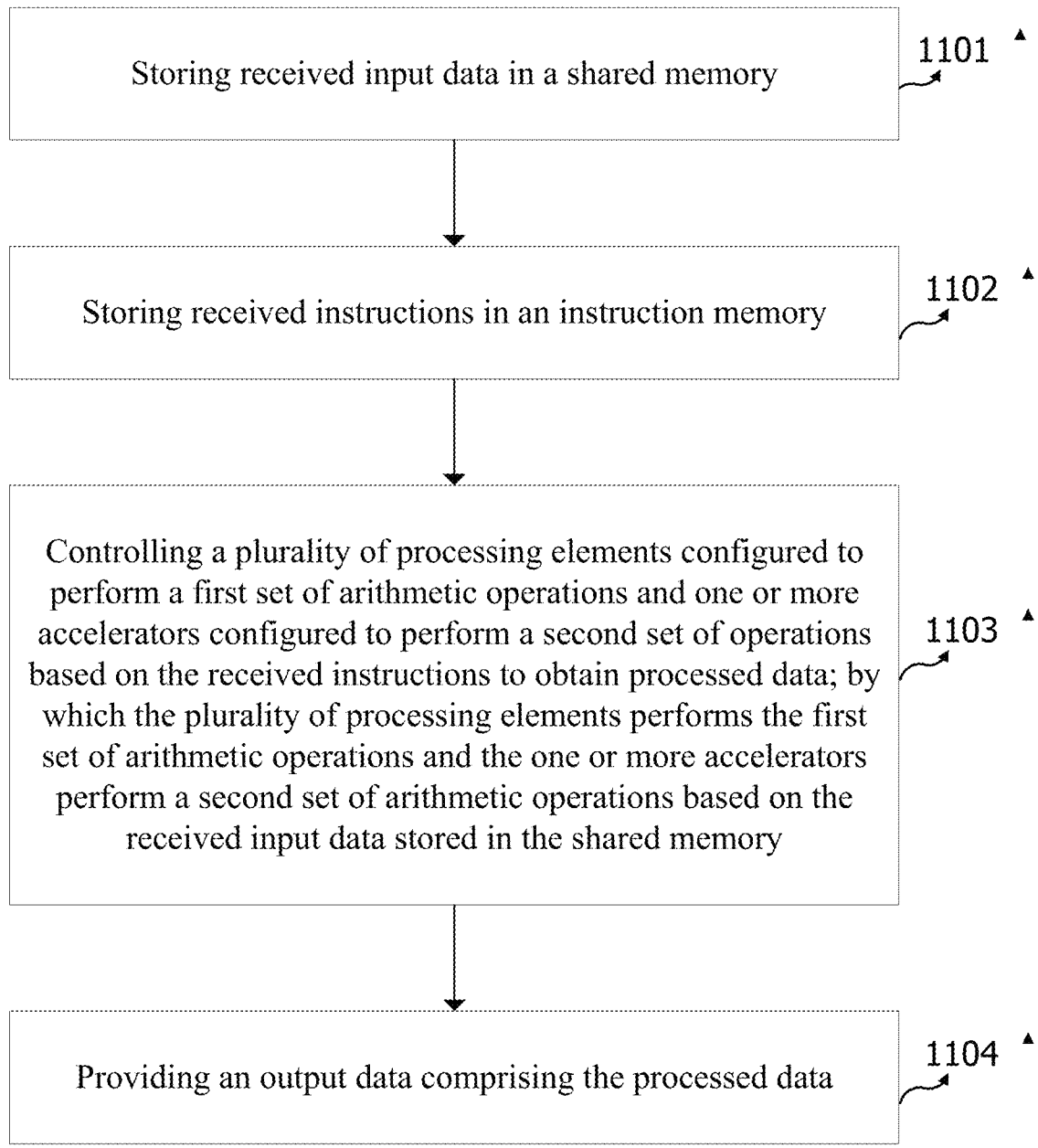
FIG. 11 shows an example of a method.

FIG. 11 shows an example of a method. The method may include storing 1101 received input data in a shared memory, storing 1102 received instructions in an instruction memory, controlling 1103 a plurality of processing elements configured to perform a first set of arithmetic operations and one or more accelerators configured to perform a second set of operations based on the received instructions to obtain processed data; by which the plurality of processing elements performs the first set of arithmetic operations and the one or more accelerators perform a second set of arithmetic operations based on the received input data stored in the shared memory, and providing 1104 an output data including the processed data. A non-transitory computer-readable medium may include instructions which, when executed by a processor, cause the processor to perform the method.

Figure 12:
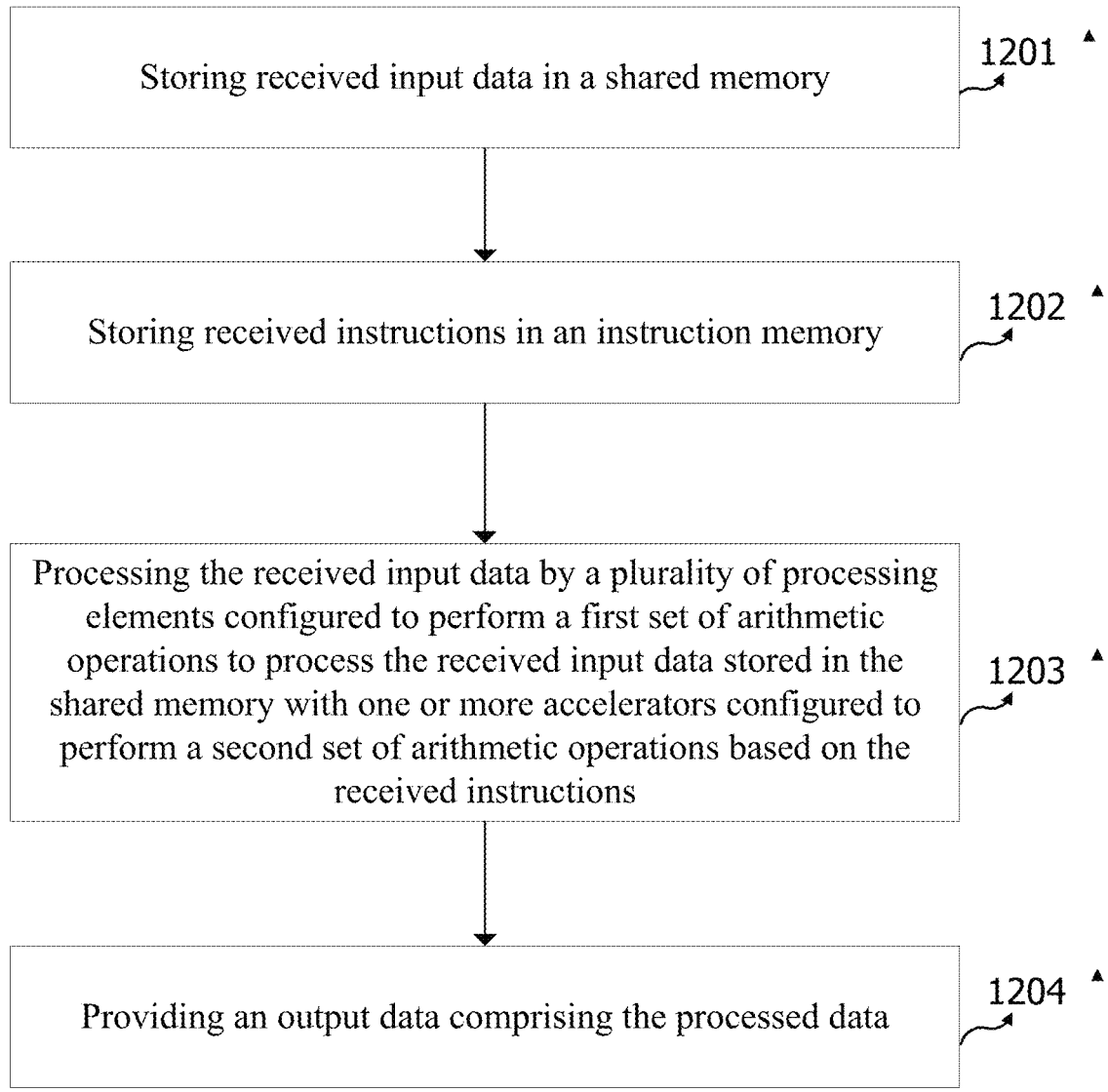
FIG. 12 shows an example of a method.

FIG. 12 shows an example of a method. The method may include storing 1201 received input data in a shared memory, storing 1202 received instructions in an instruction memory, processing 1203 the received input data by a plurality of processing elements configured to perform a first set of arithmetic operations to process the received input data stored in the shared memory with one or more accelerators configured to perform a second set of arithmetic operations based on the received instructions, providing 1204 an output data including the processed received input data.

Figure 13:
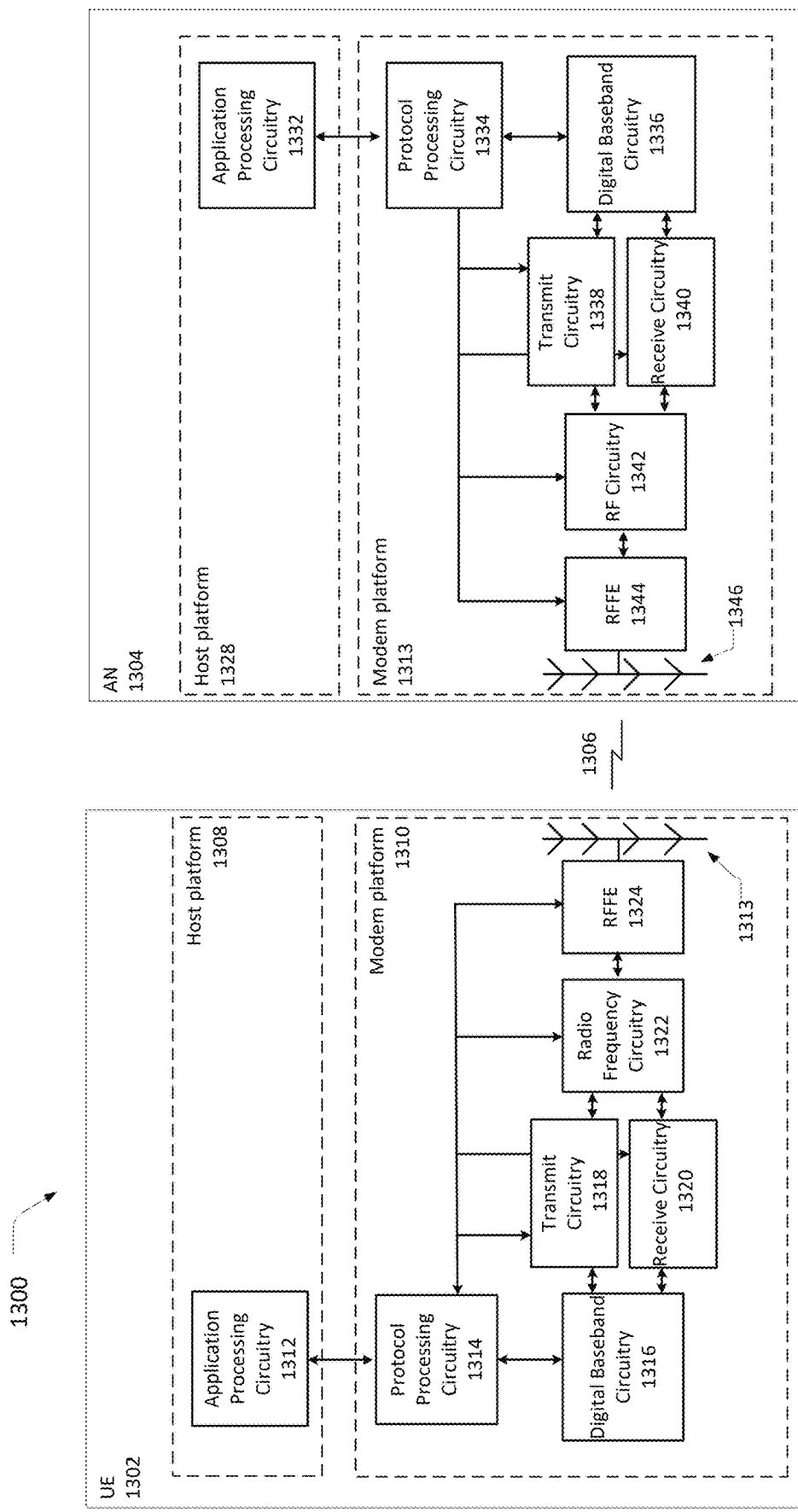
FIG. 13 exemplarily illustrates a wireless network.

FIG. 13 exemplarily illustrates a wireless network 1300 in accordance with various aspects. The wireless network 1300 may include a UE 1302 in wireless communication with an AN 1304. The UE 1302 or the AN 1304 may include a processor or a processing system as provided in this disclosure. The UE 1302 and AN 1304 may be similar to, and substantially interchangeable with, like-named components described elsewhere herein.

The UE 1302 may be communicatively coupled with the AN 1304 via connection 1306. The connection 806 is illustrated as an air interface to enable communicative coupling, and can be consistent with cellular communications protocols such as an LTE protocol or a 5G NR protocol operating at mmWave or sub-6 GHz frequencies.

The UE 1302 may include a host platform 1308 coupled with a modem platform 1310. The host platform 1308 may include application processing circuitry 1312, which may be coupled with protocol processing circuitry 1314 of the modem platform 1310. The application processing circuitry 1312 may run various applications for the UE 1302 that source/sink application data. The application processing circuitry 1312 may further implement one or more layer operations to transmit/receive application data to/from a data network. These layer operations may include transport (for example user datagram protocol (UDP)) and Internet (for example, internet protocol (IP)) operations The protocol processing circuitry 1314 may implement one or more of layer operations to facilitate transmission or reception of data over the connection 1306. The layer operations implemented by the protocol processing circuitry 1314 may include, for example, MAC, RLC, PDCP, RRC and NAS operations.

The modem platform 1310 may further include digital baseband circuitry 1316 that may implement one or more layer operations that are "below" layer operations performed by the protocol processing circuitry 1314 in a network protocol stack. These operations may include, for example, physical layer (PHY) operations including one or more of hybrid automatic repeat request (HARQ)-acknowledgment (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1310 may further include transmit circuitry 1318, receive circuitry 1320, RF circuitry 1322, and RF front end (RFFE) 1324, which may include or connect to one or more antenna panels 1326. Briefly, the transmit circuitry 1318 may include a digital-to-analog converter, mixer, intermediate frequency (IF) components, etc.; the receive circuitry 1320 may include an analog-to-digital converter, mixer, IF components, etc.; the RF circuitry 1322 may include a low-noise amplifier, a power amplifier, power tracking components, etc.; RFFE 1324 may include filters (for example, surface/bulk acoustic wave filters), switches, antenna tuners, beamforming components (for example, phase-array antenna components), etc. The selection and arrangement of the components of the transmit circuitry 1318, receive circuitry 1320, RF circuitry 1322, RFFE 1324, and antenna panels 1326 (referred generically as "transmit/receive components") may be specific to details of a specific implementation such as, for example, whether communication is time division multiplexing (TDM) or frequency division multiplex (FDM), in mmWave or sub-6 gHz frequencies, etc. In some aspects, the transmit/receive components may be arranged in multiple parallel transmit/receive chains, may be disposed in the same or different chips/modules, etc.

In some aspects, the protocol processing circuitry 1314 may include one or more instances of control circuitry (not shown) to provide control functions for the transmit/receive components.

A UE reception may be established by and via the antenna panels 1326, RFFE 1324, RF circuitry 1322, receive circuitry 1320, digital baseband circuitry 1316, and protocol processing circuitry 1314. In some aspects, the antenna panels 1326 may receive a transmission from the AN 1304 by receive-beamforming signals received by a plurality of antennas/antenna elements of the one or more antenna panels 1326.

A UE transmission may be established by and via the protocol processing circuitry 1314, digital baseband circuitry 1316, transmit circuitry 1318, RF circuitry 1322, RFFE 1324, and antenna panels 1326. In some aspects, the transmit components of the UE 1304 may apply a spatial filter to the data to be transmitted to form a transmit beam emitted by the antenna elements of the antenna panels 1326.

Similar to the UE 1302, the AN 1304 may include a host platform 1328 coupled with a modem platform 1330. The host platform 1328 may include application processing circuitry 1332 coupled with protocol processing circuitry 1334 of the modem platform 1330. The modem platform may further include digital baseband circuitry 1336, transmit circuitry 1338, receive circuitry 1340, RF circuitry 1342, RFFE circuitry 1344, and antenna panels 1346. The components of the AN 1304 may be similar to and substantially interchangeable with like-named components of the UE 1302. In addition to performing data transmission/reception as described above, the components of the AN 1308 may perform various logical functions that include, for example, radio network controller (RNC) functions such as radio bearer management, uplink and downlink dynamic radio resource management, and data packet scheduling.

Figure 14:
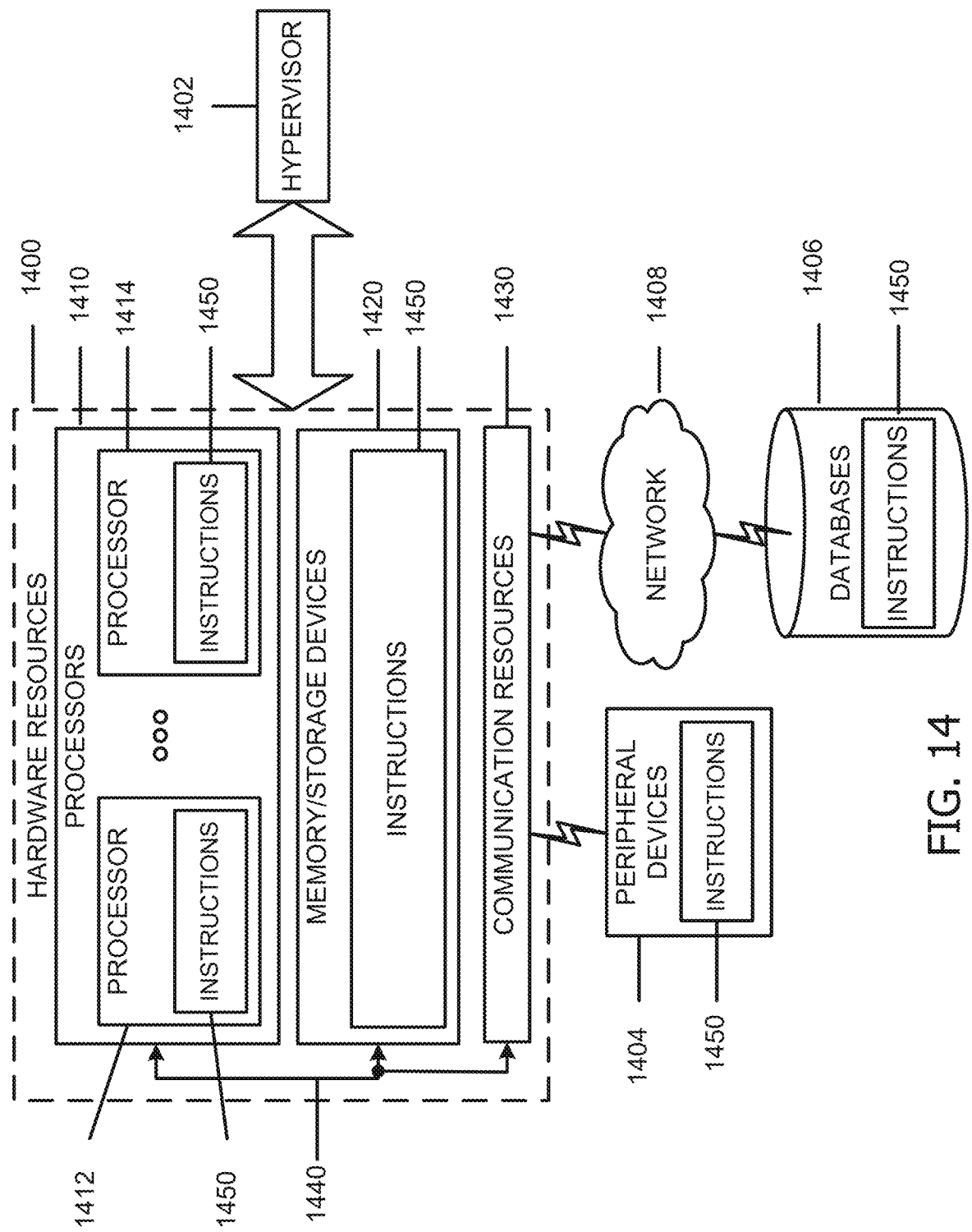
FIG. 14 is a block diagram illustrating components, according to some example aspects.

FIG. 14 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440 or other interface circuitry. For aspects where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processors 1410 may be, for example, a central processing unit (CPU), a reduced instruction set computing (RISC) processor, a complex instruction set computing (CISC) processor, a graphics processing unit (GPU), a digital signal processer (DSP) such as a baseband processor, an application-specific integrated circuit (ASIC), an field-programmable gate array (FPGA), a radio-frequency integrated circuit (RFIC), another processor (including those discussed herein), or any suitable combination thereof. The processor 1410 may include a processor as provided in this disclosure.

The memory/storage devices 1420 may include main memory, disk storage, or any suitable combination thereof. The memory/storage devices 1420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface controllers, components, or other suitable devices to communicate with one or more peripheral devices 1404 or one or more databases 1406 or other network elements via a network 1408. For example, the communication resources 1430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1450 may include software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media. In various examples, a non-transitory computer-readable medium including one or more instructions which, if executed by a processor, cause the processor to: access environment information including an indication of an amount of a crowd of road users intersecting with a predetermined route of a vehicle in a road environment, prioritize an anticipated movement of at least one road user of the crowd of road users relative to a predicted movement of the vehicle within the predetermined route based on the amount of the crowd of road users; and determine an action to be taken by the vehicle allowing the anticipated movement of the at least one road user of the crowd of road users. The one or more instructions may further cause the processor to act as provided in this disclosure.

The following examples pertain to further aspects of this disclosure.

In example 1, the subject matter includes a processor including: an interface configured to receive input data and instructions, and to provide processed data; a shared memory configured to store the received input data; an instruction memory configured to store the received instructions; a plurality of processing elements configured to perform a first set of arithmetic operations; a controller configured to control the plurality of processing elements and one or more accelerators based on the received instructions, by which the plurality of processing elements performs the first set of arithmetic operations and the one or more accelerators perform a second set of arithmetic operations based on the received input data stored in the shared memory to obtain the processed data.

In example 2, the subject matter of example 1 further including: a status memory configured to store status information indicating an operational status of the processor. In example 3, the subject matter of example 1 or example 2, further including: a plurality of processing element memories, each processing element memory is coupled to one of the plurality of processing elements and configured to store data exclusively for the one of the plurality of processing elements. In example 4, the subject matter of any one of examples 1 to 3, further including: a scratchpad memory coupled to the plurality of processing elements and configured to store temporary data for the plurality of processing elements.

In example 5, the subject matter of any one of examples 1 to 4, wherein the controller is configured to prevent an access of the one or more accelerators to the shared memory when the processor operates in an idle mode. In example 6, the subject matter of any one of examples 1 to 5, wherein the controller is configured to control the plurality of processing elements and the one or more accelerators with a double buffering operation at the shared memory. In example 7, the subject matter of any one of examples 1 to 6, wherein the received instructions include the first set of arithmetic operations.

In example 8, the subject matter of any one of examples 1 to 7, wherein the received instructions further include the second set of arithmetic operations. In example 9, the subject matter of any one of examples 1 to 8, wherein each processing element is configured to perform the first set of arithmetic operations. In example 10, the subject matter of any one of examples 1 to 9, can optionally include that the processor is a single instruction multiple data processor. In example 11, the subject matter of any one of examples 1 to 10, can optionally include that the received instructions include at least one of a Bayesian channel estimation algorithm, a Bayesian algorithm for wireless applications, a physical layer signal processing algorithm.

In example 12, the subject matter of any one of examples 1 to 11, can optionally include that the received instructions include a plurality of instructions; can optionally include that the received instructions further include a scheduling information indicating a schedule for each of the plurality of instructions. In example 13, the subject matter of example 12, can optionally include that the controller is configured to control the plurality of processing elements to perform operations according to the each of the plurality of instructions based on the scheduling information. In example 14, the subject matter of any one of examples 1 to 13, can optionally include that the controller is further configured to provide accelerator status information indicating the one or more accelerators that the controller controls.

In example 15, the subject matter of example 14, can optionally include that the accelerator status information further includes an indication whether the one or more accelerators are idle or not. In example 16, the subject matter of any one of examples 1 to 15, can optionally include that the controller is couplable to the one or more accelerators based on the received instructions. In example 17, the subject matter of any one of examples 1 to 16, can optionally include that the controller is configured to select the one or more accelerators based on the received instructions. In example 18, the subject matter of example 17, can optionally include that the interface is further configured to receive acceleration availability information indicating available accelerators; can optionally include that the controller is configured to select the one or more accelerators from the available accelerators.

In example 19, the subject matter of any one of examples 17 or 18, can optionally include that the controller is further configured to generate accelerator service information indicating the one or more accelerators that the processor receives a service from; can optionally include that the interface is configured to provide the accelerator service information. In example 20, the subject matter of any one of examples 17 to 19, can optionally include that the received instructions further include information indicating the arithmetic operations for the one or more accelerators. In example 21, the subject matter of any one of examples 17 to 20, can optionally include that the controller is configured to select the one or more accelerators based on the received instructions and the information indicating the arithmetic operations for the one or more accelerators.

In example 22, the subject matter of any one of examples 1 to 21, can optionally include that the received input data includes data representing a plurality of subband signals of a received radio communication signal. In example 23, the subject matter of any one of examples 1 to 22, can optionally include that each processing element is configured to perform the first set of arithmetic operations on a subband data representing a subband signal of the received radio communication signal. In example 24, the subject matter of example 23, can optionally include that the one or more accelerators are configured to perform the second set of arithmetic operations on the subband data. In example 25, the subject matter of example 24, can optionally include that the processed data includes an estimated channel parameter based on each subband signal of the received radio communication signal.

In example 26, the subject matter of any one of examples 1 to 25, can optionally include that the second set of arithmetic operations includes at least one of a matrix multiplication for a matrix up to 4 by 4 by size, a fast Fourier transform (FFT) operation up to 16 point FFT, a set of butterfly operations to combine previously calculated FFTs, a matrix inverse operation, a vector multiplication operation, or a vector addition operation. In example 27, the subject matter of any one of examples 1 to 26, can optionally include that the first set of arithmetic operations includes at least one of a real addition operation, a complex addition operation, a real multiplication operation, a complex multiplication operation, an accumulation operation, a real multiply and accumulate operation, a complex multiply and accumulate operation, a vector addition operation, an symbol probability calculation operation with an exponential configuration, an absolute value operation, a squared absolute operation, a real division operation, a real inverse operation, a maximum vector value operation, or a minimum vector value operation.

In example 28, the subject matter of any one of examples 1 to 27, can optionally include that the controller is further configured to control the interface. In example 29, the subject matter of any one of examples 1 to 28, further may include: the one or more accelerators.

In example 30, a method may include: storing received input data in a shared memory; storing received instructions in an instruction memory; controlling a plurality of processing elements configured to perform a first set of arithmetic operations and one or more accelerators configured to perform a second set of operations based on the received instructions to obtain processed data; by which the plurality of processing elements performs the first set of arithmetic operations and the one or more accelerators perform a second set of arithmetic operations based on the received input data stored in the shared memory; providing an output data may include the processed data.

In example 31, a non-transitory computer-readable medium may include one or more instructions which, if executed by a processor, cause the processor to: store received input data in a shared memory; store received instructions in an instruction memory; control a plurality of processing elements configured to perform a first set of arithmetic operations and one or more accelerators configured to perform a second set of operations based on the received instructions to obtain processed data; by which the plurality of processing elements performs the first set of arithmetic operations and the one or more accelerators perform a second set of arithmetic operations based on the received input data stored in the shared memory; provide an output data may include the processed data.

In example 32, the subject matter includes a system that may include: one or more accelerators configured to perform a first set of arithmetic operations; a processor may include: an interface configured to receive an input data and instructions and provide an output data may include a processed data; a shared memory configured to store received input data; an instruction memory configured to store received instructions; a plurality of processing elements configured to perform a first set of arithmetic operations; a controller configured to control the plurality of processing elements to process the received input data with the one or more accelerators in the shared memory based on the received instructions to obtain the processed data.

In example 33, the subject matter of example 32, can optionally include that the processor further includes a status memory configured to store status information indicating an operational status of the processor. In example 34, the subject matter of example 32 or example 33, can optionally include that the processor further includes a plurality of processing element memories, each processing element memory is coupled to one of the plurality of processing elements and configured to store data exclusively for the one of the plurality of processing elements.

In example 35, the subject matter of any one of examples 32 to 34, can optionally include that the processor further includes a scratchpad memory coupled to the plurality of processing elements and configured to store temporary data for the plurality of processing elements. In example 36, the subject matter of any one of examples 32 to 35, can optionally include that the controller is configured to prevent an access of the one or more accelerators to the shared memory when the processor operates in an idle mode. In example 37, the subject matter of any one of examples 32 to 36, can optionally include that the received instructions include the first set of arithmetic operations.

In example 38, the subject matter of any one of examples 32 to 37, can optionally include that each processing element is configured to perform the first set of arithmetic operations. In example 39, the subject matter of any one of examples 32 to 38, can optionally include that the processor is a single instruction multiple data processor. In example 40, the subject matter of any one of examples 32 to 39, can optionally include that the received instructions include at least one of a Bayesian channel estimation algorithm, a Bayesian algorithm for wireless applications, a physical layer signal processing algorithm.

In example 41, the subject matter of any one of examples 32 to 40, can optionally include that the received instructions include a plurality of instructions; can optionally include that the received instructions further include a scheduling information indicating a schedule for each of the plurality of instructions; can optionally include that the controller is configured to control the plurality of processing elements to perform operations according to the each of the plurality of instructions based on the scheduling information. In example 42, the subject matter of any one of examples 32 to 41, can optionally include that the controller is configured to select the one or more accelerators to receive a service based on the received instructions.

In example 43, the subject matter of any one of examples 32 to 42, further may include a main processor configured to provide the input data and the instructions. In example 44, the subject matter of example 43, can optionally include that the controller is configured to control the one or more accelerators. In example 45, the subject matter of example 43 or example 44, can optionally include that the main processor is configured to control the one or more accelerators for the processor. In example 46, the subject matter of any one of examples 43 to 45, can optionally include that the main processor is configured to control the interface; can optionally include that the main processor is further configured to access the shared memory to provide the input data and to receive the output data.

In example 47, the subject matter of any one of examples 43 to 46, can optionally include that the controller is configured to prevent the access of the main processor to the shared memory when the processor operates in an operation mode. In example 48, the subject matter of any one of examples 43 to 47, can optionally include that the processor is further configured to receive accelerator status information indicating available accelerators from the main processor; can optionally include that the controller is configured to select the one or more accelerators from the available accelerators.

In example 49, the subject matter of any one of examples 43 to 48, can optionally include that the processor is further configured to receive accelerator operation information indicating arithmetic operations that one of the one or more accelerators performs from the main processor; can optionally include that the controller is configured to select the one or more accelerators based on the accelerator operation information. In example 50, the subject matter of any one of examples 43 to 49, can optionally include that the controller is further configured to generate accelerator service information indicating the one or more accelerators scheduled to perform arithmetic operations in the shared memory. In example 51, the subject matter of any one of examples 43 to 50, can optionally include that the accelerator service information further includes information indicating the one or more accelerators that the controller selects.

In example 52, the subject matter of any one of examples 43 to 51, can optionally include that the main processor is configured to receive the accelerator service information; can optionally include that the main processor is configured to generate the accelerator status information based on the received accelerator service information. In example 53, the subject matter of any one of examples 43 to 52, can optionally include that each of the one or more accelerators is configured to perform one arithmetic operation of the second set of operations.

In example 54, the subject matter of any one of examples 43 to 53, can optionally include that the received input data includes data representing a plurality of subband signals of a received radio communication signal. In example 55, the subject matter of example 54, can optionally include that each processing element is configured to perform the first set of arithmetic operations on a subband data representing a subband signal of the received radio communication signal. In example 56, the subject matter of example 55, can optionally include that the one or more accelerators are configured to perform the second set of arithmetic operations on the subband data. In example 57, the subject matter of example 56, can optionally include that the processed data includes an estimated channel parameter based on each subband signal of the received radio communication signal.

In example 58, the subject matter of any one of examples 54 to 57, can optionally include that the main processor is configured to receive the estimated channel parameters and generate a channel matrix representing a communication channel. In example 59, the subject matter of any one of examples 43 to 58, can optionally include that the processor is a first processor; can optionally include that the system further includes at least a second processor may include: a second processor shared memory configured to store second processor input data; a second processor instruction memory configured to store second processor instructions; a plurality of second processor processing elements configured to perform a third first set of arithmetic operations; a second processor controller configured to control the plurality of second processor processing elements to perform the second set of arithmetic operations to process the input data received by the second processor in the second processor shared memory based on the received instructions; a second processor interface configured to receive input data and instructions and provide an output data may include the processed input data.

In example 60, the subject matter of example 59, can optionally include that the third set of arithmetic operations includes the second set of arithmetic operations; can optionally include that the main processor is configured to provide the input data representing a first set of subband signals to the first processor and the second processor input data representing a second set of subband signals to the second processor. In example 61, the subject matter of example 59, can optionally include that the second processor interface is communicatively coupled with the interface of the first processor. In example 62, the subject matter of example 61, can optionally include that the second set of arithmetic operations and the third set of arithmetic operations include at least one different arithmetic operation; can optionally include that the second processor is configured to receive the output data of the first processor.

In example 63, the subject matter of example 62, can optionally include that the second processor is configured to receive the instructions from the main processor. In example 64, the subject matter of any one of examples 32 to 63, can optionally include that the first set of arithmetic operations includes at least one of a matrix multiplication for a matrix up to 4 by 4 by size, a fast Fourier transform (FFT) operation up to 16 point FFT, a set of butterfly operations to combine previously calculated FFTs, a matrix inverse operation, a vector multiplication operation, or a vector addition operation. In example 65, the subject matter of any one of examples 32 to 64, can optionally include that the second set of arithmetic operations includes at least one of a real addition operation, a complex addition operation, a real multiplication operation, a complex multiplication operation, an accumulation operation, a real multiply and accumulate operation, a complex multiply and accumulate operation, a vector addition operation, an symbol probability calculation operation with an exponential configuration, an absolute value operation, a squared absolute operation, a real division operation, a real inverse operation, a maximum vector value operation, or a minimum vector value operation. In example 66, A method may include: storing received input data in a shared memory; storing received instructions in an instruction memory; processing by a plurality of processing elements configured to perform a first set of arithmetic operations the received input data stored in the shared memory with one or more accelerators configured to perform a second set of arithmetic operations based on the received instructions; providing an output data may include the processed received input data.

In example 67, a non-transitory computer-readable medium may include one or more instructions which, if executed by a processor, cause the processor to: store received input data in a shared memory; store received instructions in an instruction memory; process a plurality of processing elements configured to perform a first set of arithmetic operations to process the received input data stored in the shared memory with one or more accelerators configured to perform a second set of arithmetic operations based on the received instructions; provide an output data may include the processed received input data.

In example 68, a processor may include: a means for receiving input data and instructions, and to provide processed data; a means for storing the received input data; a means for storing the received instructions; a means for performing a first set of arithmetic operations; a means for controlling the means for performing the first set of arithmetic operations and one or more accelerators based on the received instructions, by which the means for performing the first set of arithmetic operations performs the first set of arithmetic operations and the one or more accelerators perform a second set of arithmetic operations based on the received input data stored in the shared memory to obtain the processed data.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A processor comprising:
an interface configured to receive input data and instructions, and to provide processed data, wherein the received input data comprises data representing a plurality of subband signals of a received radio communication signal;
a shared memory configured to store the received input data;
an instruction memory configured to store the received instructions;
a plurality of processing elements configured to perform a first set of arithmetic operations, wherein each processing element of the plurality of processing elements is configured to perform the first set of arithmetic operations on a subband data representing a subband signal of the received radio communication signal;
a controller configured to control the plurality of processing elements and one or more accelerators based on the received instructions, by which the plurality of processing elements performs the first set of arithmetic operations and the one or more accelerators perform a second set of arithmetic operations based on the received input data stored in the shared memory to obtain the processed data.

2. The processor of claim 1, further comprising:
a status memory configured to store status information indicating an operational status of the processor;
a plurality of processing element memories, each processing element memory is coupled to one of the plurality of processing elements and configured to store data for the one of the plurality of processing elements;
a scratchpad memory coupled to the plurality of processing elements and configured to store temporary data for the plurality of processing elements.

3. The processor of claim 2,
wherein the controller is configured to control the plurality of processing elements and the one or more accelerators with a double buffering operation at the shared memory.

4. The processor of claim 1,
wherein the received instructions comprise the first set of arithmetic operations;
wherein each processing element is configured to perform the first set of arithmetic operations;
wherein the processor is a single instruction multiple data processor.

5. The processor of claim 4,
wherein the received instructions comprise at least one of a Bayesian channel estimation algorithm, a Bayesian algorithm for wireless applications, a physical layer signal processing algorithm.

6. The processor of claim 1,
wherein the received instructions comprise a plurality of instructions;
wherein the received instructions further comprise a scheduling information indicating a schedule for each of the plurality of instructions;
wherein the controller is configured to control the plurality of processing elements to perform operations according to the each of the plurality of instructions based on the scheduling information.

7. The processor of claim 1,
wherein the controller is further configured to provide accelerator status information indicating the one or more accelerators that the controller controls;
wherein the accelerator status information further comprises an indication whether the one or more accelerators are idle or not.

8. The processor of claim 1,
wherein the controller is configured to select the one or more accelerators based on the received instructions;
wherein the interface is further configured to receive acceleration availability information indicating available accelerators;

wherein the controller is configured to select the one or more accelerators from the available accelerators.

9. The processor of claim 1,
wherein the controller is further configured to generate accelerator service information indicating the one or more accelerators that the processor receives a service from;
wherein the interface is configured to provide the accelerator service information.

10. The processor of claim 1,
wherein the received instructions further comprise information indicating the arithmetic operations for the one or more accelerators;
wherein the controller is configured to select the one or more accelerators based on the received instructions and the information indicating the arithmetic operations for the one or more accelerators.

11. The processor of claim 1,
wherein the one or more accelerators are configured to perform the second set of arithmetic operations on the subband data.

12. The processor of claim 11,
wherein the processed data comprises an estimated channel parameter based on each subband signal of the received radio communication signal.

13. The processor of claim 1,
wherein the second set of arithmetic operations comprises at least one of a matrix multiplication for a matrix up to 4 by 4 by size, a fast Fourier transform (FFT) operation up to 16 point FFT, a set of butterfly operations to combine previously calculated FFTs, a matrix inverse operation, a vector multiplication operation, or a vector addition operation.

14. The processor of claim 13,
wherein the first set of arithmetic operations comprises at least one of a real addition operation, a complex addition operation, a real multiplication operation, a complex multiplication operation, an accumulation operation, a real multiply and accumulate operation, a complex multiply and accumulate operation, a vector addition operation, an symbol probability calculation operation with an exponential configuration, an absolute value operation, a squared absolute operation, a real division operation, a real inverse operation, a maximum vector value operation, or a minimum vector value operation.

15. A system comprising:
one or more accelerators configured to perform a first set of arithmetic operations;
a processor comprising:
an interface configured to receive an input data and instructions and provide an output data comprising a processed data, wherein the received input data comprises data representing a plurality of subband signals of a received radio communication signal;
a shared memory configured to store received input data;
an instruction memory configured to store received instructions;
a plurality of processing elements configured to perform a first set of arithmetic operations, wherein each processing element of the plurality of processing elements is configured to perform the first set of arithmetic operations on a subband data representing a subband signal of the received radio communication signal;
a controller configured to control the plurality of processing elements to process the received input data with the one or more accelerators in the shared memory based on the received instructions to obtain the processed data.

16. The system of claim 15,
further comprising a main processor configured to provide the input data and the instructions;
wherein the main processor is configured to control the one or more accelerators for the processor.

17. The system of claim 16,
wherein the processor is further configured to receive accelerator status information indicating available accelerators from the main processor;
wherein the controller is configured to select the one or more accelerators from the available accelerators.

18. The system of claim 16,
wherein the processor is further configured to receive accelerator operation information indicating arithmetic operations that one of the one or more accelerators performs from the main processor;
wherein the controller is configured to select the one or more accelerators based on the accelerator operation information.

19. The system of claim 17,
wherein the controller is further configured to generate accelerator service information indicating the one or more accelerators scheduled to perform arithmetic operations in the shared memory;
wherein the accelerator service information further comprises information indicating the one or more accelerators that the controller selects;
wherein the main processor is configured to receive the accelerator service information;
wherein the main processor is configured to generate accelerator status information based on the received accelerator service information.

20. The system of claim 16,
wherein the one or more accelerators are configured to perform a second set of arithmetic operations on the subband data;
wherein the processed data comprises an estimated channel parameter based on each subband signal of the received radio communication signal;
wherein the main processor is configured to receive the estimated channel parameters and generate a channel matrix representing a communication channel.

21. The system of claim 16,
wherein the processor is a first processor;
wherein the system further comprises at least a second processor comprising:
a second processor shared memory configured to store second processor input data;
a second processor instruction memory configured to store second processor instructions;
a plurality of second processor processing elements configured to perform a third set of arithmetic operations;
a second processor controller configured to control the plurality of second processor processing elements to perform a second set of arithmetic operations to process the input data received by the second processor in the second processor shared memory based on the received instructions;
a second processor interface configured to receive input data and instructions and provide an output data comprising the input data.

22. The system of claim 21,
wherein the second processor interface is communicatively coupled with the interface of the first processor;

wherein the second set of arithmetic operations and the third set of arithmetic operations comprise at least one different arithmetic operation;
wherein the second processor is configured to receive the output data of the first processor.

23. The system of claim 22,
wherein the second processor is configured to receive the instructions from the main processor.

24. A processor comprising:
a means for receiving input data and instructions, and to provide processed data, wherein the received input data comprises data representing a plurality of subband signals of a received radio communication signal;
a means for storing the received input data;
a means for storing the received instructions;
a processing means for performing a first set of arithmetic operations, wherein the processing means comprises a plurality of processing elements and wherein each processing element of the processing means is configured to perform the first set of arithmetic operations on a subband data representing a subband signal of the received radio communication signal;
a controlling means for controlling the processing means and one or more accelerators based on the received instructions, by which the processing means performs the first set of arithmetic operations and the one or more accelerators perform a second set of arithmetic operations based on the received input data stored in a shared memory to obtain the processed data.

25. The processor of claim 24,
wherein the received instructions comprise at least one of a Bayesian channel estimation algorithm, a Bayesian algorithm for wireless applications, a physical layer signal processing algorithm.

* * * * *